(12) United States Patent  (10) Patent No.: US 8,681,785 B2
Shirai et al.  (45) Date of Patent: Mar. 25, 2014

(54) COMMUNICATION APPARATUS AND PATH SETTING CONTROL METHOD

(75) Inventors: Katsuhiro Shirai, Kawasaki (JP); Kanji Naito, Kawasaki (JP); Koji Takeguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 863 days.

(21) Appl. No.: 12/579,767

(22) Filed: Oct. 15, 2009

(65) Prior Publication Data

US 2010/0118872 A1  May 13, 2010

(30) Foreign Application Priority Data

Nov. 12, 2008 (JP) .................................. 2008-289742

(51) Int. Cl.
*H04L 12/28* (2006.01)
(52) U.S. Cl.
USPC .......................................... 370/389; 370/474
(58) Field of Classification Search
None
See application file for complete search history.

(56) References Cited

U.S. PATENT DOCUMENTS

| | | | | |
|---|---|---|---|---|
| 5,208,811 A | * | 5/1993 | Kashio et al. | 370/401 |
| 6,298,057 B1 | * | 10/2001 | Guy et al. | 370/389 |
| 6,469,814 B1 | * | 10/2002 | Park et al. | 398/79 |
| 7,929,569 B2 | * | 4/2011 | Bourlas et al. | 370/473 |
| 2003/0026260 A1 | * | 2/2003 | Ogasawara et al. | 370/392 |
| 2003/0091026 A1 | * | 5/2003 | Penfield et al. | 370/352 |
| 2004/0008685 A1 | * | 1/2004 | Yamano et al. | 370/395.5 |
| 2004/0151421 A1 | * | 8/2004 | Yasue et al. | 385/16 |
| 2004/0162079 A1 | * | 8/2004 | Koshino et al. | 455/445 |
| 2004/0235472 A1 | * | 11/2004 | Fujishima et al. | 455/434 |
| 2006/0053250 A1 | * | 3/2006 | Saze | 711/114 |
| 2006/0101221 A1 | * | 5/2006 | Harada | 711/170 |
| 2006/0242377 A1 | * | 10/2006 | Kanie et al. | 711/165 |
| 2006/0245436 A1 | * | 11/2006 | Sajassi | 370/395.53 |
| 2007/0110035 A1 | * | 5/2007 | Bennett | 370/352 |
| 2007/0208693 A1 | * | 9/2007 | Chang et al. | 707/2 |
| 2007/0274224 A1 | * | 11/2007 | Suzuki et al. | 370/248 |
| 2008/0275637 A1 | * | 11/2008 | Kim et al. | 701/201 |
| 2009/0109925 A1 | * | 4/2009 | Nakamura et al. | 370/331 |
| 2010/0103837 A1 | * | 4/2010 | Jungck et al. | 370/252 |
| 2010/0118872 A1 | * | 5/2010 | Shirai et al. | 370/389 |

FOREIGN PATENT DOCUMENTS

JP  2006-157102  6/2006
JP  2007-318288  12/2007

* cited by examiner

*Primary Examiner* — Bunjob Jaroenchonwanit
(74) *Attorney, Agent, or Firm* — Staas & Halsey LLP

(57) ABSTRACT

A communication apparatus operable to set a path based on path setting information used to set a communication path over a communication network formed by a plurality of the communication apparatuses, the communication apparatus including a first storage medium operable to store first path setting information formatted with a first format, a second storage medium operable to store second path setting information formatted with a second format, and a controller operable to control to convert control information of the communication apparatus in which the first path setting information stored in the first storage medium is set, to the second path setting information formatted with the second format.

6 Claims, 34 Drawing Sheets

FIG. 7

| | C-PLANE PATH INFORMATION | | | MANUALLY MANAGED PATH INFORMATION | | |
|---|---|---|---|---|---|---|
| | ID NAME | ID FORMATION | EXAMPLE | ID NAME | ID FORMATION | EXAMPLE |
| 1 | NODE ID | IPv4 | 192.168.1.0 | TID | ALPHA-NUMERIC CHARACTERS | FW4500-1 |
| 2 | LINK ID | INTEGER (1..xxx) | 1 | FACILITY AID | ⟨SLOT#⟩-⟨PORT#⟩ | 3-1 |
| 3 | CH ID | INTEGER (1..192) | 1 | STSn AID | ⟨STSn#⟩ | STS1 |
| 4 | CALL ID | IPv4 | 1.1.1.1 | NA | NA | NA |
| 5 | CONN ID #1 | IPv4 | 1.1.1.1 | NA | NA | NA |
| | CONN ID #2 | IPv4 | 2.2.2.2 | NA | NA | NA |
| | CONN ID #3 | IPv4 | 3.3.3.3 | NA | NA | NA |
| | CONN ID #4 | IPv4 | 4.4.4.4 | NA | NA | NA |
| | CONN ID #5 | IPv4 | 5.5.5.5 | NA | NA | NA |

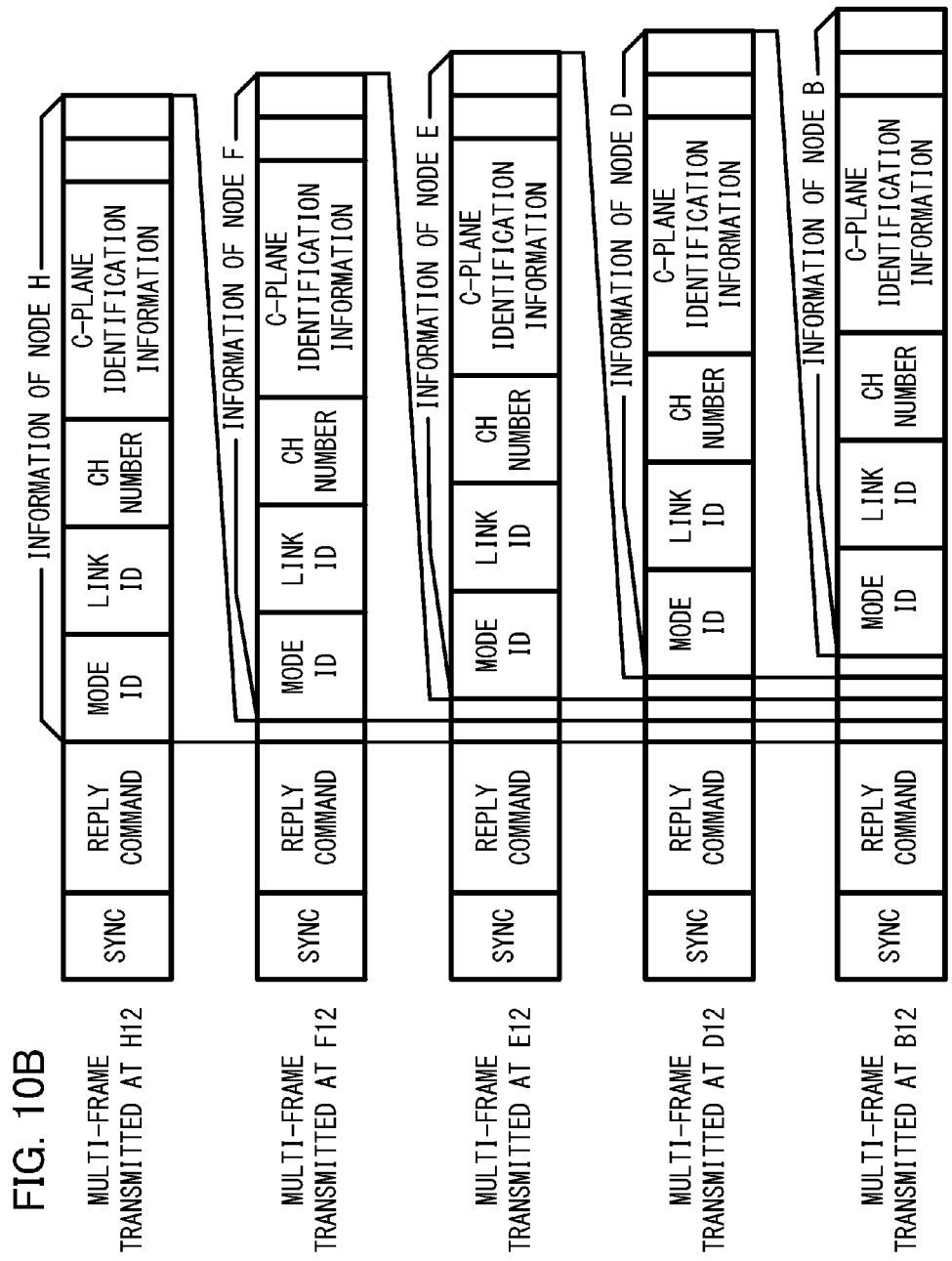

FIG. 19A

NODE-A MANUALLY MANAGED PATH INFORMATION

| FROM SIDE ID | TO SIDE ID | BANDWIDTH |
|---|---|---|
| 3-1-1 | 4-1-1 | STS1 |
| 5-1-1 | 6-1-1 | STS1 |
| 7-1-1 | 8-1-1 | STS1 |

NODE-A C-PLANE PATH INFORMATION

| NODE | LINK | CH | CALL | CONN |
|---|---|---|---|---|
| 192.168.1.0 | 1 | 1 | 1.1.1.1 | 1.1.1.1 |
| 192.168.1.0 | 1 | 2 | 1.1.1.1 | 2.2.2.2 |

FIG. 19B

NODE-B MANUALLY MANAGED PATH INFORMATION

| FROM SIDE ID | TO SIDE ID | BANDWIDTH |
|---|---|---|
| 3-1-1 | 4-1-1 | STS1 |
| 5-1-1 | 6-1-1 | STS1 |

NODE-B C-PLANE PATH INFORMATION

| NODE | LINK | CH | CALL | CONN |
|---|---|---|---|---|
| 192.168.1.1 | 1 | 1 | 1.1.1.1 | 1.1.1.1 |
| 192.168.1.1 | 1 | 2 | 1.1.1.1 | 2.2.2.2 |

FIG. 19C

NODE-D MANUALLY MANAGED PATH INFORMATION

| FROM SIDE ID | TO SIDE ID | BANDWIDTH |
|---|---|---|
| 3-1-1 | 4-1-1 | STS1 |
| 5-1-1 | 6-1-1 | STS1 |
| 7-1-1 | 8-1-1 | STS1 |

NODE-D C-PLANE PATH INFORMATION

| NODE | LINK | CH | CALL | CONN |
|---|---|---|---|---|
| 192.168.1.2 | 1 | 1 | 1.1.1.1 | 1.1.1.1 |
| 192.168.1.2 | 1 | 2 | 1.1.1.1 | 2.2.2.2 |

FIG. 20A

NODE-A MANUALLY MANAGED PATH INFORMATION

| FROM SIDE ID | TO SIDE ID | BANDWIDTH |
|---|---|---|
| 5-1-1 | 6-1-1 | STS1 |
| 7-1-1 | 8-1-1 | STS1 |

NODE-A C-PLANE PATH INFORMATION

| NODE | LINK | CH | CALL | CONN |
|---|---|---|---|---|
| 192.168.1.0 | 1 | 1 | 1.1.1.1 | 1.1.1.1 |
| 192.168.1.0 | 1 | 2 | 1.1.1.1 | 2.2.2.2 |
| 192.168.1.0 | 1 | 3 | 1.1.1.1 | 3.3.3.3 |

FIG. 20B

NODE-B MANUALLY MANAGED PATH INFORMATION

| FROM SIDE ID | TO SIDE ID | BANDWIDTH |
|---|---|---|
| 5-1-1 | 6-1-1 | STS1 |

NODE-B C-PLANE PATH INFORMATION

| NODE | LINK | CH | CALL | CONN |
|---|---|---|---|---|
| 192.168.1.1 | 1 | 1 | 1.1.1.1 | 1.1.1.1 |
| 192.168.1.1 | 1 | 2 | 1.1.1.1 | 2.2.2.2 |
| 192.168.1.1 | 1 | 3 | 1.1.1.1 | 3.3.3.3 |

FIG. 20C

NODE-D MANUALLY MANAGED PATH INFORMATION

| FROM SIDE ID | TO SIDE ID | BANDWIDTH |
|---|---|---|
| 5-1-1 | 6-1-1 | STS1 |
| 7-1-1 | 8-1-1 | STS1 |

NODE-D C-PLANE PATH INFORMATION

| NODE | LINK | CH | CALL | CONN |
|---|---|---|---|---|
| 192.168.1.2 | 1 | 1 | 1.1.1.1 | 1.1.1.1 |
| 192.168.1.2 | 1 | 2 | 1.1.1.1 | 2.2.2.2 |
| 192.168.1.2 | 1 | 3 | 1.1.1.1 | 3.3.3.3 |

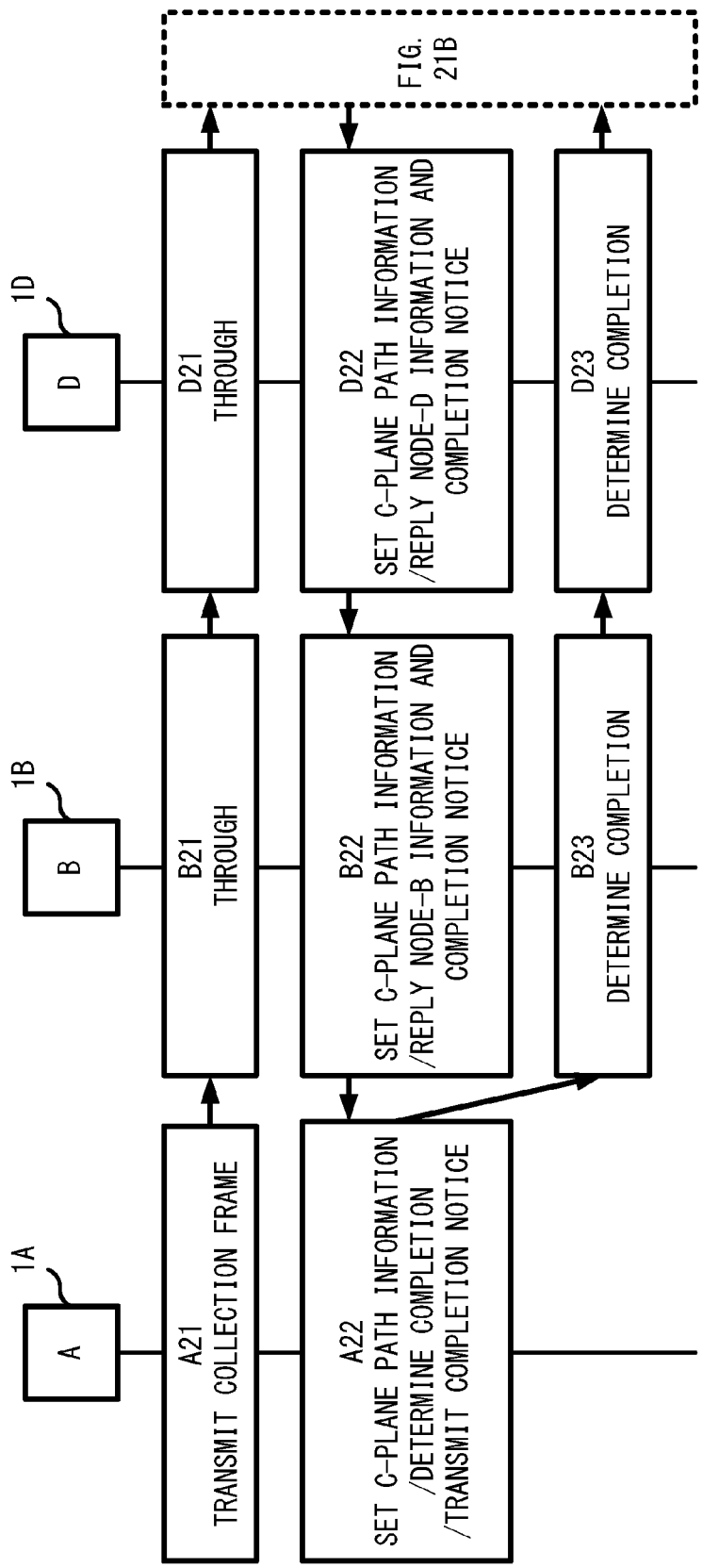

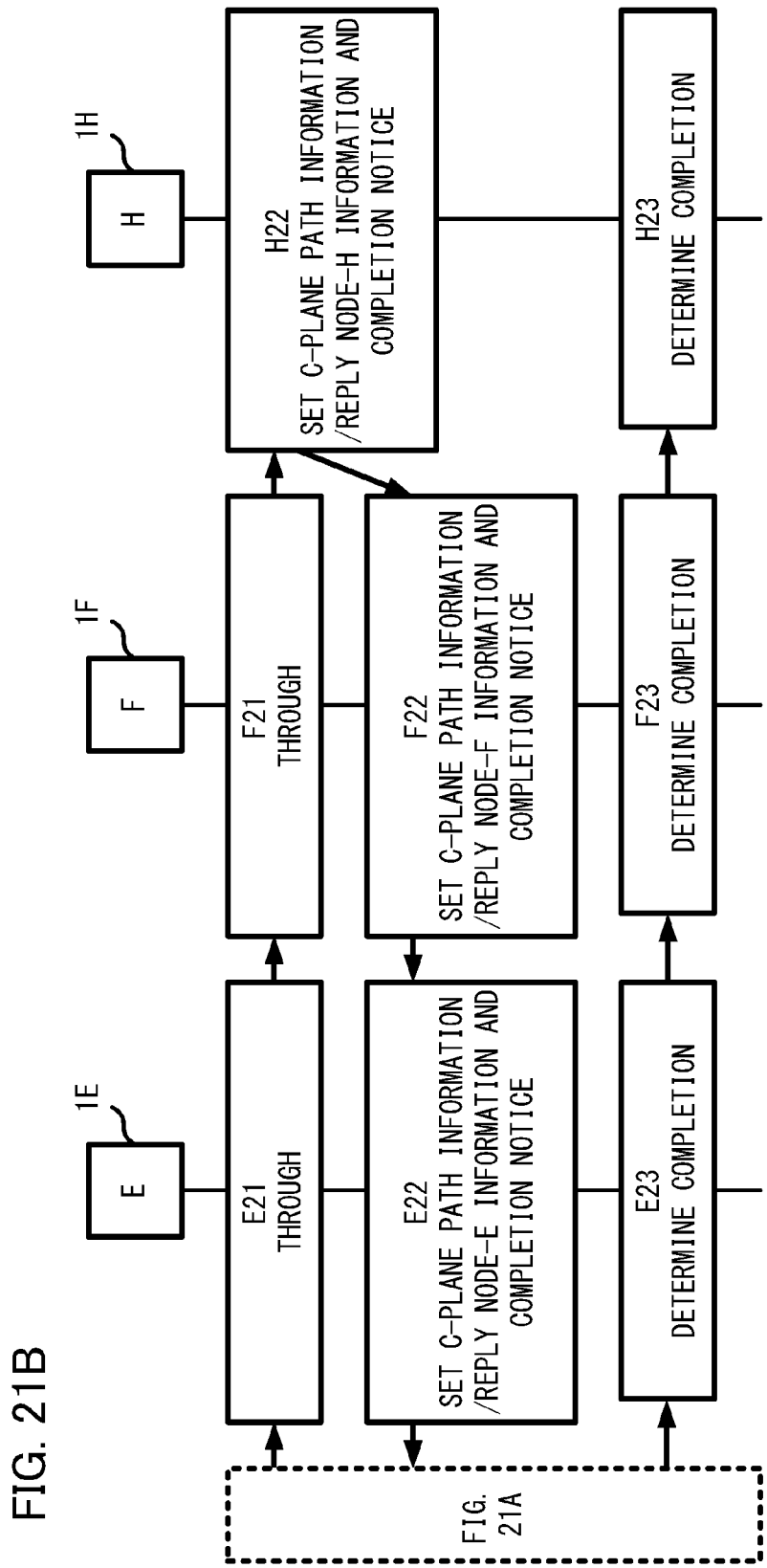

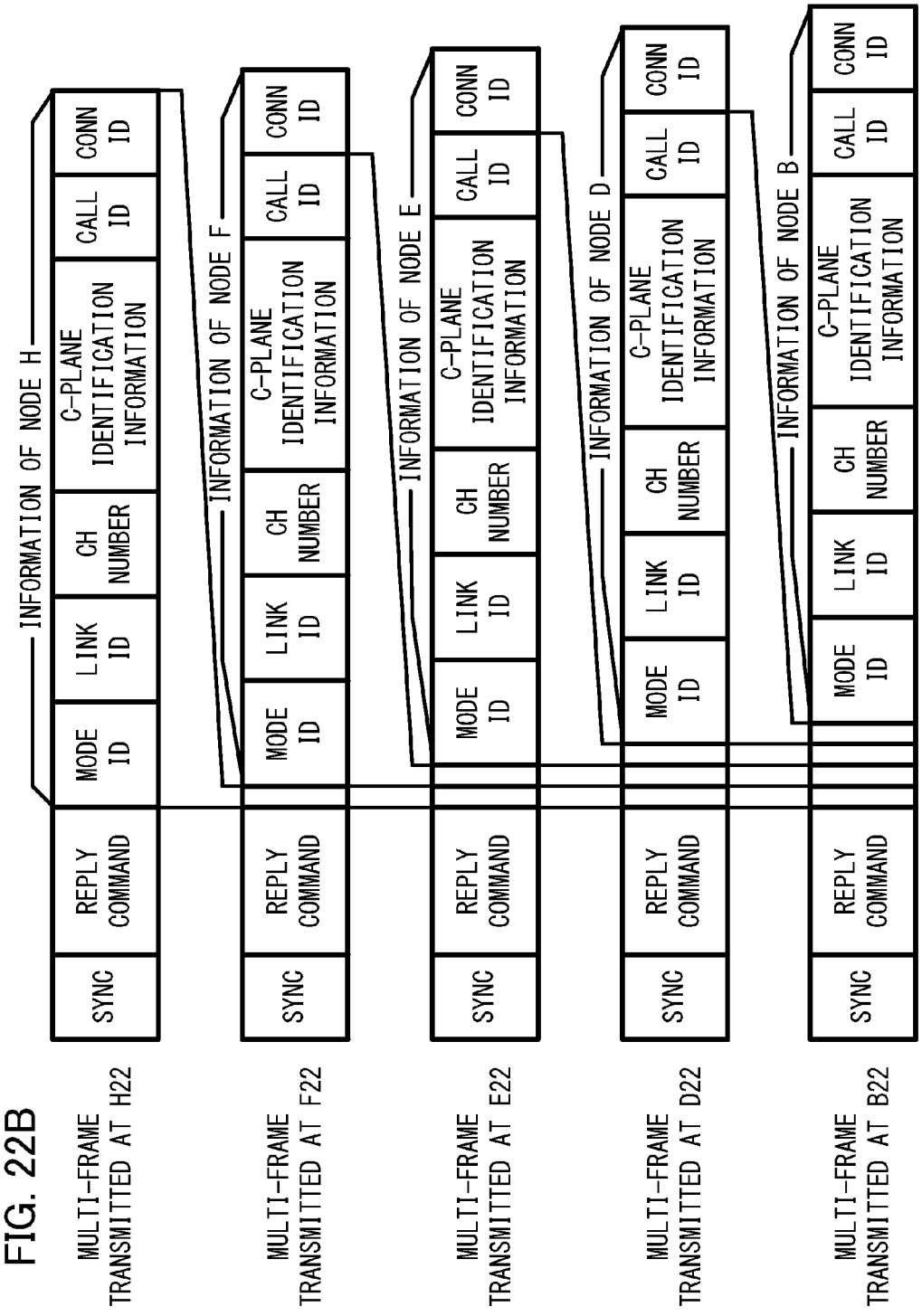

COMMUNICATION APPARATUS AND PATH SETTING CONTROL METHOD

CROSS-REFERENCE TO RELATED APPLICATION

This application is based upon and claims the benefit of priority of the prior Japanese Patent Application No. 2008-289742, filed on Nov. 12, 2008, the entire contents of which are incorporated herein by reference.

FIELD

The embodiments discussed herein are related to a communication apparatus and a path setting control method. The communication apparatus includes, for example, a communication apparatus having setting information related to a communication path.

BACKGROUND

As a network interface for realizing Broadband Aspects of Integrated Services Digital Network (B-ISDN), there is a Synchronous Optical NETwork/Synchronous Digital Hierarchy (SONET/SDH) method.

In a communication network of the SONET/SDH method (hereinafter, also described SONET/SDH network), a data signal is transmitted by using a data frame (transmission frame) having an overhead section and a payload section. The overhead section has, for example, a pointer for indicating a relative start position of the payload (data main body) contained in the payload section. In this way, the transmission frame contains the payload by setting any position of the payload section as the start position of the payload.

Here, SONET/SDH is a collective term of the Synchronous Optical NETwork (SONET) and the Synchronous Digital Hierarchy (SDH).

SONET is standardized by the American National Standards Institute (ANSI). The basic unit of multiplexing is 51.84 Mbps, which may be called OC-1 (Optical Carrier-level 1). A channel in which signals of 51.84 Mbps are multiplexed is represented as OC-n (n is a positive integer).

On the other hand SDH is standardized by the International Telecommunications Union (ITU). The basic unit of multiplexing is 155.52 Mbps, which may be called STM-1 (Synchronous Transmission Module-level 1). A channel in which signals of 155.52 Mbps are multiplexed is represented as STM-m (m is a multiple of 4).

The above described SONET/SDH network realizes high-speed communication by multiplexing a plurality of channels hierarchically.

Wavelength Division Multiplexing (WDM) for transmitting a plurality of optical signals having different wavelengths is known. In a communication network of the WDM method, since a plurality of optical transmission paths are virtually included in one transmission path, different types of optical signals and different protocols of communication are overlapped in one path.

In addition, a communication network in which SONET/SDH and WDM are combined (hereinafter, called a SONET/SDH/WDM network) is known. In the SONET/SDH/WDM network, for example, a plurality of SONET/SDH transmission frames are optically converted by light sources having different wavelengths, wavelength-multiplexed, and thereafter transmitted to a transmission path. Therefore, the SONET/SDH/WDM network has, for example, a configuration in which a plurality of communication apparatuses (hereinafter, called nodes) are connected by transmission paths (for example, optical fibers).

For example, a node for transmission in the SONET/SDH/WDM network converts input signals (for example, OC-n signals of SONET or the like) into optical signals having a different wavelength for each channel, multiplexes these optical signals by using an optical multiplexer, and transmits the multiplexed optical signal into one optical fiber. On the other hand, for example, a node for reception demultiplexes the optical wavelength-multiplexed signal into each wavelength by using an optical demultiplexer, and performs reception processing on the demultiplexed signals. Each node includes, for example, a cross-connect function for transmitting an optical signal from a start node to an end node of a communication path.

The cross-connect function is a function for transmitting a signal inputted into an input port of a node to a predetermined output port on the basis of cross-connect information set in advance.

For example, a network administrator controls input/output of an optical signal in a node by setting cross-connect information in the node. It is known that a signal transmission path is established between nodes in this way.

In addition, it is known that a Generalized Multi-Protocol Label Switching (GMPLS) protocol is used in the SONET/SDH/WDM network. By using the GMPLS protocol, for example, it is possible to operate a communication network in an autonomous-decentralized way.

As a technique rerated to GMPLS, a method in which, in a communication network including nodes having GMPLS and nodes not having GMPLS, all settings necessary for GMPLS control are preliminarily set in the nodes not having GMPLS is known, in Japanese Laid-open Patent Publication No. 2007-318288.

Also, a method in which a wavelength path is added or deleted in accordance with a result of traffic calculation is known, in Japanese Laid-open Patent Publication No. 2006-157102.

SUMMARY

According to an aspect of the embodiment, there is provided a communication apparatus operable to set a path based on path setting information used to set a communication path over a communication network formed by a plurality of the communication apparatuses, the communication apparatus including a first storage medium operable to store first path setting information formatted with a first format, a second storage medium operable to store second path setting information formatted with a second format, and a controller operable to control to convert control information of the communication apparatus in which the first path setting information stored in the first storage medium is set, to the second path setting information formatted with the second format.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a correspondence relationship between manually managed path information and C-Plane path information;

FIG. 10B is a diagram illustrating an example of multi-frames;

FIGS. 19A to 19C are diagrams illustrating an example of the path setting information before conversion;

FIGS. 20A to 20C are diagrams illustrating an example of the path setting information after conversion;

FIGS. 21A and 21B are diagrams illustrating an example of a communication control operation according to a second embodiment;

FIG. 22B is a diagram illustrating an example of a multi-frame;

DESCRIPTION OF EMBODIMENTS

Figure 1:
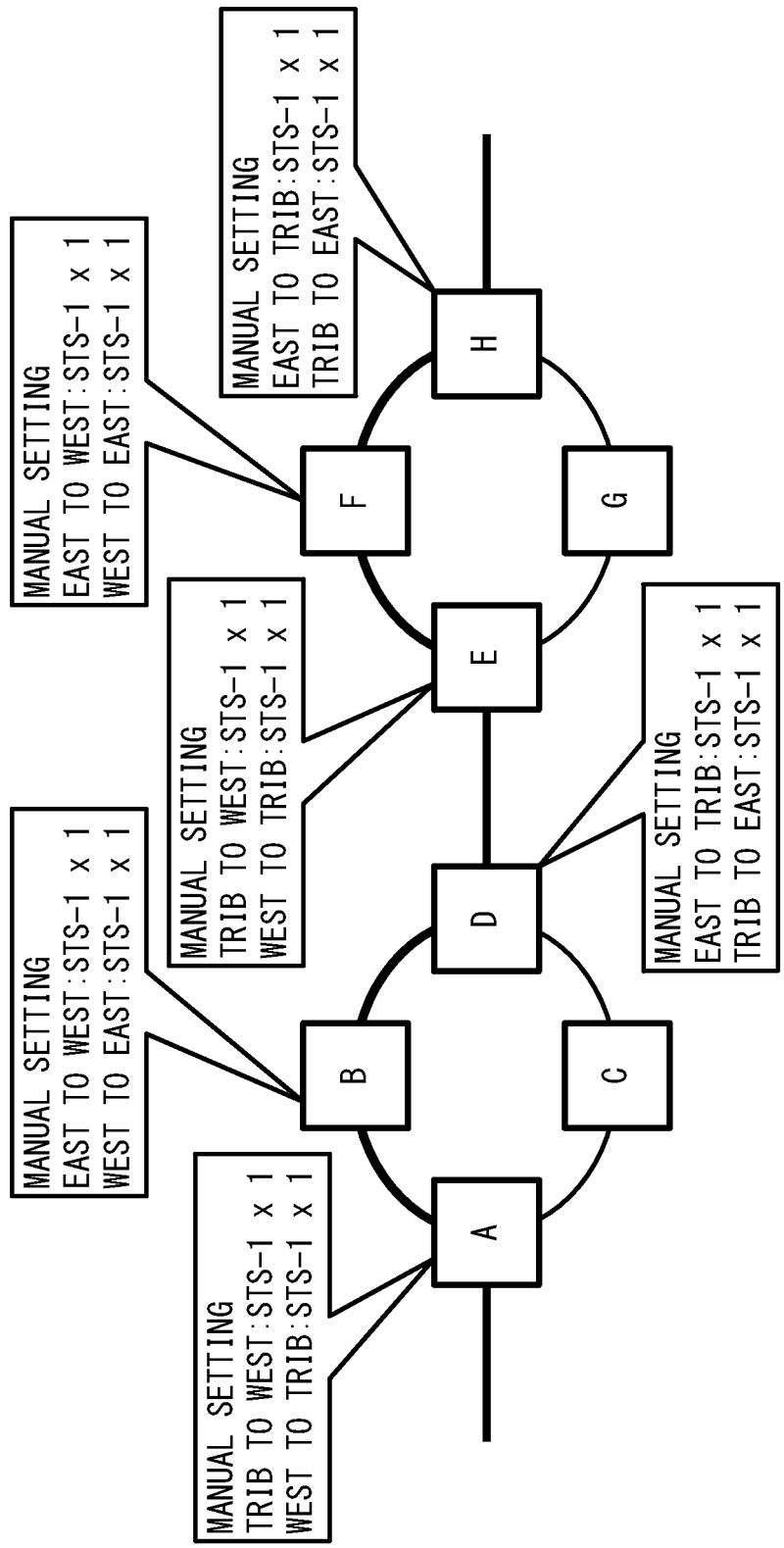
FIG. 1 is a diagram illustrating an example of a SONET/SDH/WDM network.

FIG. 1 is a diagram illustrating an example of a SONET/SDH/WDM network. In FIG. 1, as an example, nodes A, B, C and D are connected in a ring shape by an optical fiber, and nodes E, F, G and H are connected in a ring shape by an optical fiber. The two rings are connected by an optical fiber, and communication is performed between each node by using an optical signal. The node A and the node H communicate with each other by using an electric signal via, for example, a node or network, and a signal transmission path (for example, a coaxial cable) which are not illustrated in the figure.

In such a SONET/SDH/WDM network, as described above, by setting cross-connect information in the nodes A to H, any transmission channels are connected and any transmission channels are branched. The cross-connect information is, for example, manually set by a network administrator, who inputs various commands.

For example, to establish a path (depicted by bold lines in FIG. 1) which sequentially passes through the nodes A, B, D, E, F and H, first, "Trib to West: STS-1×1, West to Trib: STS-1×1" is set in the node A as the cross-connect information. This means that an input/output path in which an STS-1 transmission frame is transmitted in a direction from Tributary (that is a node or a network not illustrated in the figure) to West (node B) and in the opposite direction is established in the node A.

In the node B, "East to West: STS-1×1, West to East: STS-1×1" is manually set. This means that an input/output path in which an STS-1 transmission frame is transmitted in a direction from East (node A) to West (node D) and in the opposite direction is established in the node B.

In the similar way, in the nodes D to H, the cross-connect information as illustrated in FIG. 1 is manually set, and a predetermined input/output path is defined, so that a path between the start node A and the end node H is established.

As described above, when establishing a desired path between a plurality of nodes, a network administrator or the like manually sets the cross-connect information for each node.

However, when using the above method, there is a risk that an operation and management of the network may be complicated and cumbersome.

On the other hand, standardization of the GMPLS/Automatically Switched Optical Network (GMPLS/ASON) technique which automatically determine a path (routing) on the basis of the wavelength of the optical signal is promoted by the Internet Engineering Task Force (IETF), the Optical Internetworking Forum (OIF), the International Telecommunication Union (ITU) and the like, and a part of the standardized technique is being put in practical use.

The GMPLS/ASON includes protocols of the User-Network Interface for the C-Plane (UNI), the Internal Network-to-Network Interface (I-NNI), the External Network-to-Network Interface (E-NNI) and the like. UNI, I-NNI and E-NNI are standardized interfaces of the Control-Plane (C-Plane) in GMPLS. For example, a control such as the cross-connect is performed by using the C-Plane, and user data transmission is performed by using a transmission plane.

I-NNI and E-NNI include techniques such as the Link Management Protocol (LMP), the Open Shortest Path First-Traffic Engineering (OSPF-TE), the Resource Reservation Protocol-Traffic Extension (RSVP-TE) and the like. LMP is a protocol for managing a link status between adjacent nodes in GMPLS, and OSPF-TE is a protocol for transmitting information about a reservable resource. RSVP-TE is a protocol for providing an optical path.

Figure 2:
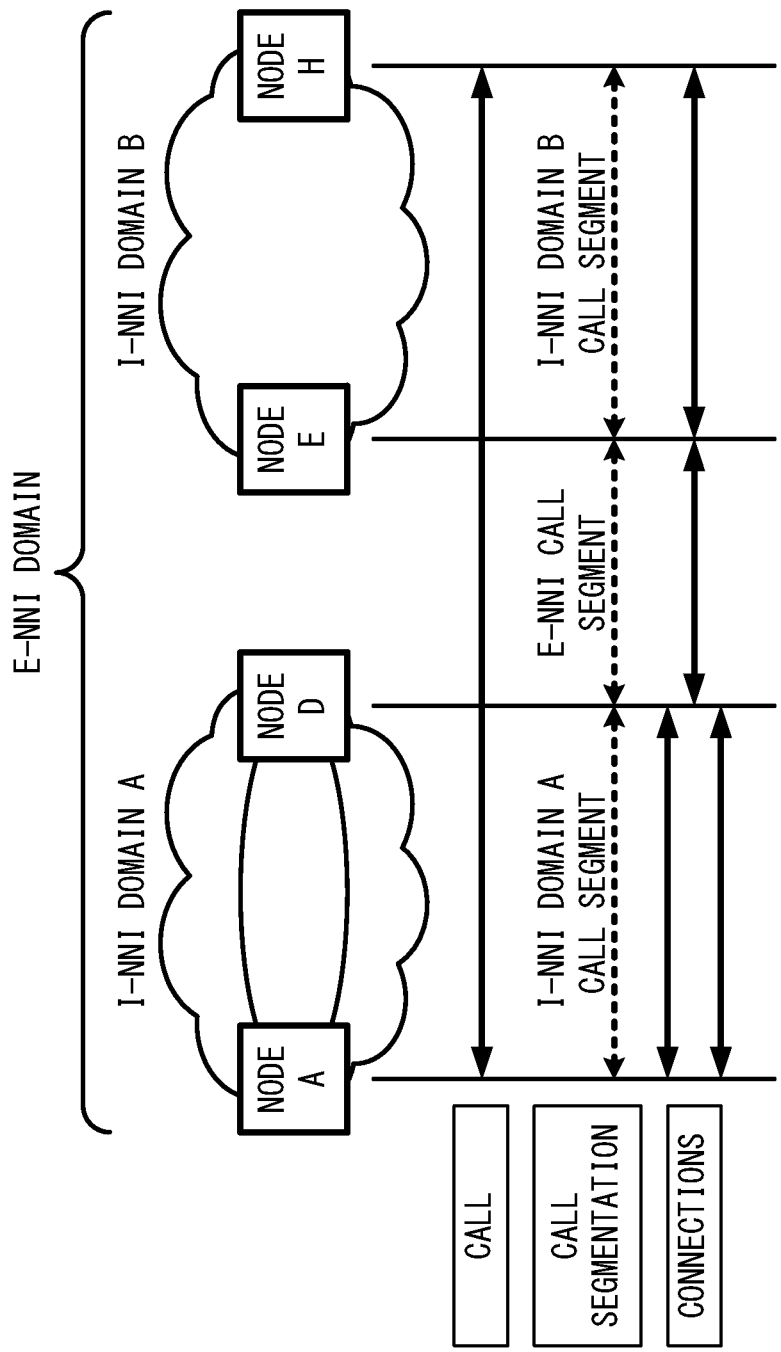
FIG. 2 is a diagram illustrating an example of a GMPLS network.

FIG. 2 is a diagram illustrating an example of a communication network (hereinafter, also called a GMPLS network) including the above protocols. The network illustrated in FIG. 2 exemplarily includes an I-NNI domain A including at least the node A and the node D, and an I-NNI domain B including at least the node E and the node H. Each node is configured, for example, as a GMPLS node having the above DMPLS function. In the network illustrated in FIG. 2, an E-NNI domain including the I-NNI domain A and the I-NNI domain B is exemplarily formed.

Here, physical optical connections between the nodes are called CONNECTIONS, a path for each domain is called CALL Segmentation, and a path between the start node (for example, node A) and the end node (for example, Node H) is called Call. As illustrated in FIG. 2, as CALL Segmentation, for example, there are I-NNI Domain A Call Segment, E-NNI CALL Segment and I-NNI Domain B CALL Segment.

In such a GMPLS network, for example, by performing an E-NNI signaling, an E-NNI path is generated to establish a path between the node A and the node H. The E-NNI path is constituted by, for example, a combination of I-NNI sessions generated in each I-NNI domain, an E-NNI session generated between the I-NNI domains and UNI sessions generated in the start node and the end node. When configuring a redundant configuration in the I-NNI domain, an I-NNI path may be generated in addition to the E-NNI path.

For the E-NNI signaling, for example, a Call establishing command (CALL) in the GMPLS function may be used. This function is realized by the above protocols, and by using this function, it is possible to establish a path even when the start node and the end node belong to different domains respectively. For example, by inputting the Call establishing command from the start node A, a path from the start node A to the end node H is autonomously established.

Specifically, the Call establishing (path establishing) is performed by the above described GMPLS function as follows.

First, for example, in the network illustrated in FIG. 1, the start node A and the end node H of a target path are specified in the node A, and a path message specifying path information (Explicit Route Object, ERO) between the node A and the node H, required band information and the like is transmitted to the relay node B.

On the basis of the path information, the band information and the like specified in the path message, the relay node B sets corresponding path and band to a reserved state, and transmits the same pass message as described above to the adjacent relay node D. Also in the relay nodes D, E and F, in the similar way as in the relay node B, a reservation setting processing for the specified path information and the band information is performed.

The end node H performs a path setting (cross-connect setting) of the node H on the basis of the path information, the band information and the like specified in the path message from the relay node F. The node H transmits a response message (reserve message) including information related to the path setting of the node H to the relay node F on the start node side.

The relay node F which receives the response message from the end node H considers the path setting in the end node H to perform path setting of the node F, and transmits a response message to the relay node E on the start node side in the similar way as in the end node H.

In the similar way as in the relay node F, the relay nodes E, D and B consider the path settings (reservation states) having been performed in other nodes so as to perform path setting of the nodes E, D and B, and transmit a response message.

The start node A which receives the reserve message from the relay node B considers the path settings (reservation states) having been performed in the end node H and the relay nodes F, E, D and B so as to perform path setting of the node A.

By the above processing procedure, a bidirectional path is established between the start node A and the end node H.

As described above, when establishing a path between nodes, for example, the cross-connect information of each node is manually set, or the path is autonomously set by the GMPLS function.

By the way, there is a case in which a node has a plurality of information items (for example, path setting information) formatted by different formats such as, for example, the cross-connect information set manually (hereinafter, called manually managed path information) and the path information set by the GMPLS function (hereinafter, called C-Plane path information).

In this case, for example, it is desirable to unify the formats of the path setting information into one of the formats of the path setting information (for example, C-Plane path information) to reduce operation management cost.

However, to unify the path setting information into the C-Plane path information, there is nothing for it but to delete all the path setting information (manually managed path information, C-Plane path information and the like) of the nodes, and newly generate and set the C-Plane path information by using the above described GMPLS function.

As a result, a time period in which a node does not have the path setting information is generated, so that there is a risk that communication service stops temporarily.

Therefore, it is desirable to efficiently replace communication-path-related setting information having different formats.

Hereinafter, embodiments will be described with reference to the drawings. However, the embodiments described below are merely illustrations, and various modifications and technical applications not illustrated in the embodiments described below are not excluded intentionally. That is, the embodiments may be implemented by being variously modified (combining each embodiment or the like) without departing from the spirit and scope of the embodiments.

First Embodiment

Figure 3:
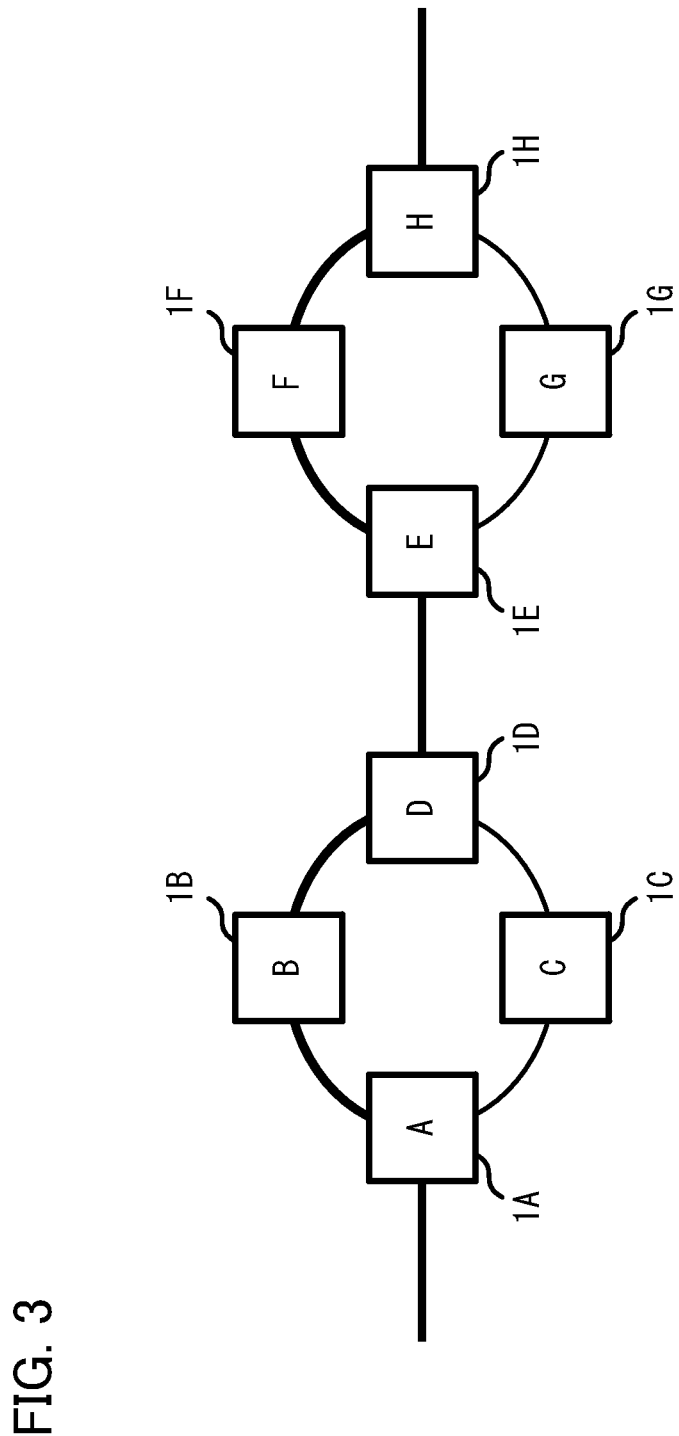
FIG. 3 is a diagram illustrating an example of a communication network according to an embodiment.

FIG. 3 is a diagram illustrating an example of a communication network according to an embodiment.

The communication network illustrated in FIG. 3 includes a plurality of nodes 1A, 1B, 1C, 1D, 1E, 1F, 1G and 1H as an example. In the example illustrated in FIG. 3, the nodes 1A, 1B, 1C and 1D are connected in a ring shape, and the nodes 1E, 1F, 1G and 1H are connected in a ring shape. Both ring networks are connected to each other, and communication between the plurality of nodes is possible. The nodes are connected by, for example, optical fibers and the like, and the connection may be duplicated so that it may be switched when failure occurs.

The nodes output an inputted optical signal to a desired path in accordance with the path setting information that each node has. Here, the path setting information includes, for example, the manually managed path information set by a network administrator or the like, and the C-Plane path information set by the GMPLS function. In other words, each node may hold a plurality of path setting information items having formats different from each other, such as the manually managed path information and the C-Plane path information.

In the description below, although a path (refer to heavy lines in FIG. 3) that starts from the node 1A, passes sequentially through the relay nodes 1B, 1D, 1E and 1F, and reaches the end node 1H is described as an example, a path established between other nodes may be used to perform the communication control of this example. When the nodes 1A to 1H are not differentiated, they are collectively called nodes 1, and the number of the nodes 1 is not limited to the number of the nodes illustrated in FIG. 3.

(1.1) Node 1

Figure 4:
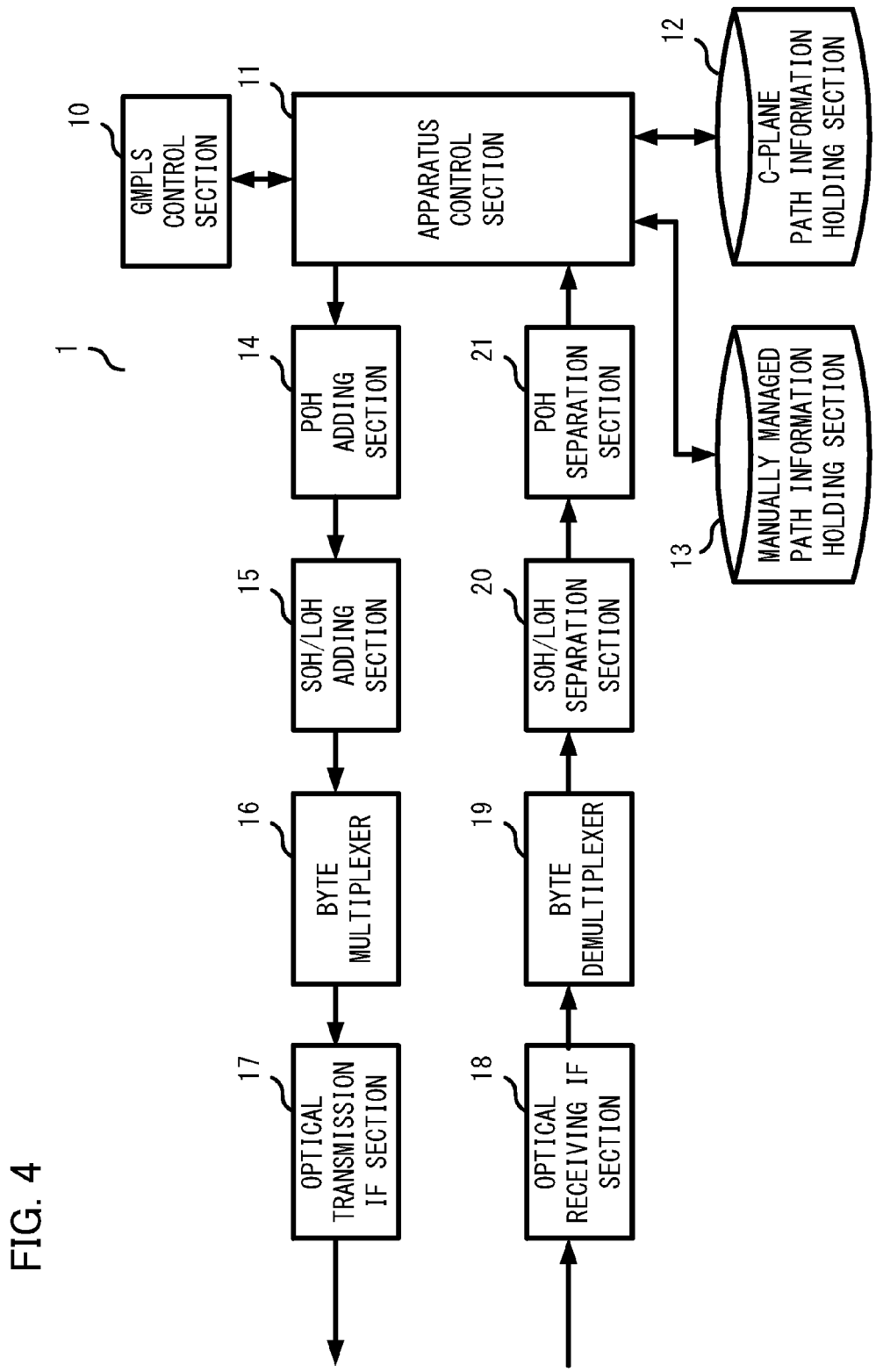
FIG. 4 is a diagram illustrating an example of a node illustrated in FIG. 3.

FIG. 4 is a diagram illustrating an example of the node 1. For example, when the network includes a plurality of nodes 1 (for example, three or more nodes 1), the node 1 is any of the start node, the relay node and the end node. However, common configuration, functions and the like will be described here.

As illustrated in FIG. 4, the node 1 includes, as an example, a GMPLS control section 10, an apparatus control section 11, a C-Plane path information holding section 12, a manually managed path information holding section 13 and a Path OverHead (POH) adding section 14. In addition, the node 1 includes, as an example, a Section OverHead/Line OverHead (SOH/LOH) adding section 15, a byte multiplexer 16 and an optical transmission interface (IF) section 17. Furthermore, the node 1 includes, as an example, an optical receiving IF section 18, a byte demultiplexer 19, an SOH/LOH separation section 20 and a POH separation section 21.

The GMPLS control section 10 controls the GMPLS function. In this example, by using the GMPLS function, it is possible to transmit/receive control information such as the path setting information on the C-Plane, and control each node on the basis of the control information. Also, by using the GMPLS function, in addition to the above, it is possible to switch the currently used path (active path) to the path duplicated in advance (standby path) when a failure occurs in the current path.

The apparatus control section 11 controls communication between the nodes 1. For example, the apparatus control section 11 inserts various data into POH (for example, J1 byte) included in the transmission frame. Thereafter, the apparatus control section 11 sets up a multi-frame (hereinafter, called POH multi-frame) by using a plurality of POHs, and performs various controls such as unifying the path setting information by using the multi-frame. For example, a receiving side recognizes the plurality of POHs from a transmitting side as a single multi-frame.

By using this multi-frame, for example, as described below, it is possible for a node 1 to inquire about the path setting information held by other node 1, or transmit the path setting information held by the node 1 to other node 1. The path setting information generated in the node 1 is transmitted to other node 1 to change the path setting information of the other node 1. Furthermore, the path setting information of the node 1 is converted (changed) on the basis of the path setting information transmitted from other node 1.

Here, an example of the above communication control using POH will be described.

J1 byte included in POH is configured into a multi-frame, and various controls are performed using the multi-frame.

Figure 5:
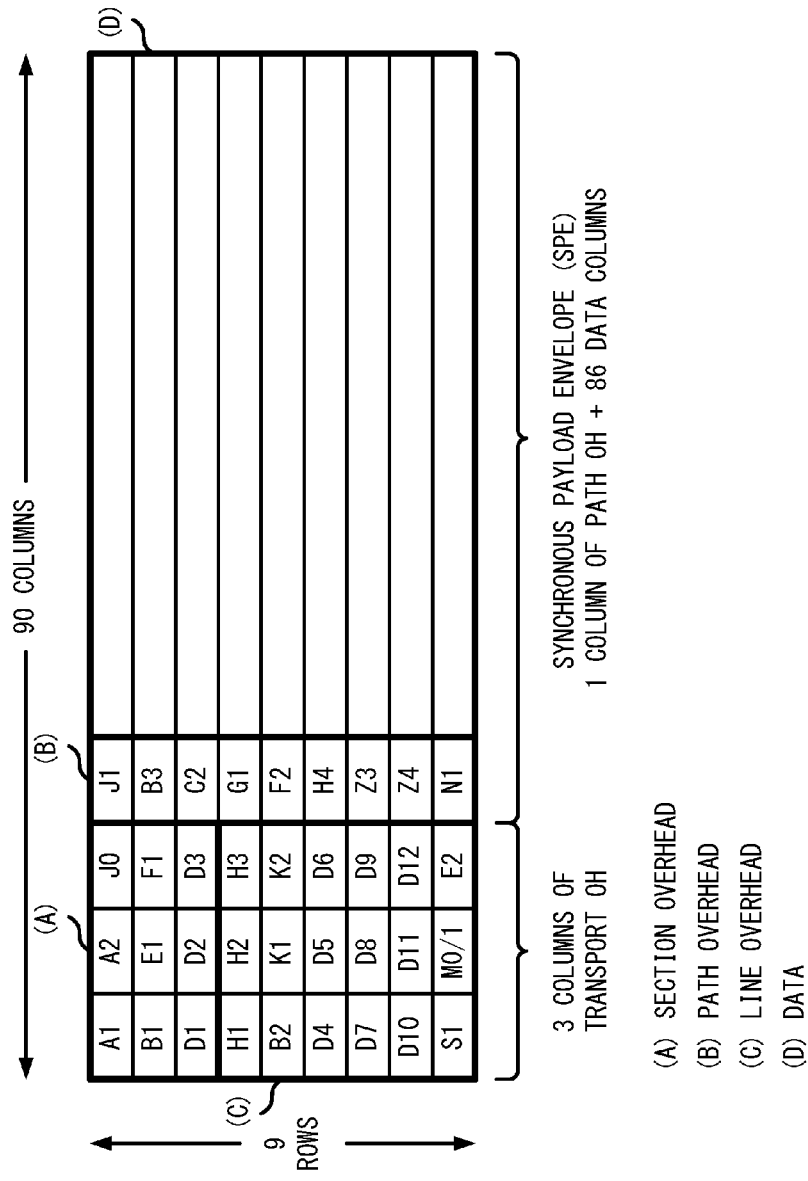
FIG. 5 is a diagram illustrating a configuration example of a transmission frame.

FIG. 5 is a diagram illustrating a configuration example of a transmission frame. The transmission frame is constituted by bytes (octets) of 9 rows by 90 columns, and includes SOH (refer to reference symbol (A)), POH (refer to reference symbol (B)), LOH (refer to reference symbol (C)) and a data section (refer to reference symbol (D)). When each of the 810 octets in the transmission frame has a transmission capability of 64 kbps, the transmission frame has a transmission capability of 51.84 Mbps. In the network of this example, 8000 transmission frames are transmitted in one second.

The first three columns including SOH and LOH are Transport OverHead (TOH), and a portion including POH and the data section is Synchronous Payload Envelope (SPE).

As illustrated in FIG. 5, SOH has A1, A2, J0, B1, E1, F1, D1, D2 and D3 bytes. For example, the A1 and A2 bytes are used for frame synchronization and the B1 byte is used for a parity of a transmitted transmission frame for monitoring a Block Error Rate (BER). The J0 byte is used for a section trace for checking whether the connection is alive.

LOH has H1 to H3, B2, K1, K2, D4 to D12, S1, M0/1 and E2 bytes. For example, the H1, H2 and H3 bytes are used for a pointer operation, and the K1 and K2 bytes are used for switching a channel.

Further, POH has J1, B3, C2, G1, F2, H4, Z3, Z4 and N1 bytes. For example, the J1 byte is used for monitoring path connection.

The B3 byte is used for monitoring a path error, the C2 byte is used for identifying path information, and the G1 byte is used for notifying of an error in the transmission path. The F2 byte is used for a maintenance channel, and the H4 byte is used for identifying a Tributary Unit (TU) multi-frame number. The Z3 and Z4 bytes are undefined bytes, and the N1 byte is for tandem connection monitoring.

As described above, the J1 byte in POH is used for monitoring path connection, and the J1 byte has an area from/to which information about each node 1 is read/written. The multi-frame may be configured by using other data area (overhead section or payload section).

Figure 6:
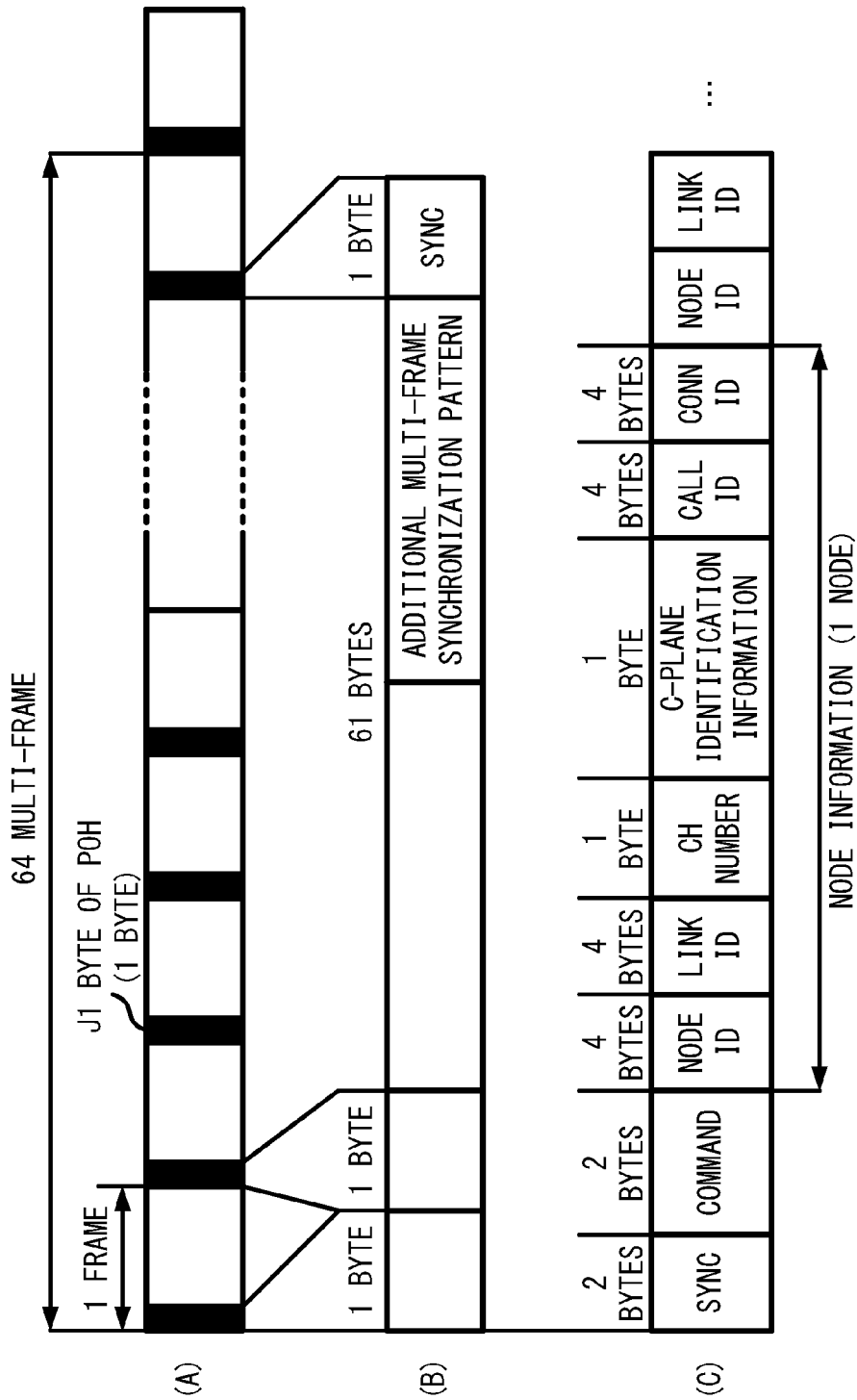
FIG. 6 is a diagram illustrating an example of a multi-frame configured by a plurality of J1 bytes.

FIG. 6 is a diagram illustrating an example of the multi-frame configured by a plurality of J1 bytes.

In this example, as illustrated in (A) and (B) of FIG. 6, a single 64-multi-frame is configured by using 64 J1 bytes. In the 64-byte data of this multi-frame, the first byte is used as an area for the connection destination apparatus number, the second byte is used as an area for the connection destination IF (interface) number, and the last byte is used as multi-frame synchronization pattern information (SYNC). For example, in the area for the connection destination apparatus number, identification information specifying the end node 1 is set, and in the area for the connection destination IF number, the connection port number of the end node 1 is set.

The receiving side recognizes the multi-frame from a plurality of received POHs (J1 bytes) by detecting synchronization information set in the multi-frame synchronization pattern information. In addition, when defining an additional multi-frame synchronization pattern [refer to (B)], data longer than 64 bytes is handled.

In this example, a plurality of information items as illustrated in (C) of FIG. 6 are set in the above multi-frame.

In the example illustrated in (C) of FIG. 6, the synchronization pattern information (SYNC) is set in the first two bytes of the multi-frame, and some kind of command is set in the next two bytes. In this command area, for example, a command (collection command) for collecting the path setting information of other node 1, a command (reply command) for returning the path setting information from other node 1, a command (execution command) for converting the path setting information of other node 1 and the like are set.

For example, the multi-frame includes data areas to be assigned to each node 1 in the data area following the command area. The data areas include data areas for Node ID, Link ID, the channel number (the CH number), C-Plane identification information, Call ID and Connection ID (Conn ID). The area from Node ID to Conn ID is a node information area for one node, and regarding the node information area as a unit of data area, data areas for a plurality of nodes are secured.

Here, the Node ID is unique identification information provided to node 1, and the Link ID is identification information for identifying an optical connection path. The CH number is identification information provided to each channel, and the C-Plane identification information is information indicating a format type of the path setting information which a node 1 has for the path. The Conn ID is information for identifying a path set between terminal nodes of GMPLS, and the Call ID is identification information provided to collectively manage a plurality of Conn IDs. The Node ID, Link ID, Call ID and the Conn ID have a size of four bytes respectively, and the CH number and the C-Plane identification information have a size of one byte respectively.

By setting various kinds of data into the multi-frame, the apparatus control section 11 realizes functions as the start node, the relay node and the end node described below.

The manually managed path information holding section 13 holds (stores) the manually managed path information manually set by a network administrator or the like. For example, the manually managed path information is an example of first path setting information formatted with a first format held by a node 1.

The C-Plane path information holding section 12 holds (stores) the C-Plane path information set by the GMPLS function. For example, the C-Plane path information is an example of second path setting information formatted with a second format including an information element (parameter) which is related to path setting and assigned in communication between nodes 1. The C-Plane path information includes, for example, Node ID, Link ID, the channel number (the CH number), Call ID, Connection ID (CONN ID) and the like as parameters.

FIG. 7 is a diagram illustrating an example of a correspondence relationship between the manually managed path information and the C-Plane path information. As illustrated in FIG. 7, the Node ID in the C-Plane path information is written with, for example, an IPv4 format (for example, "192.168.1.0" in FIG. 7). On the other hand, TID (Terminal IDentifier) in the manually managed path information is written with, for example, alpha-numeric characters (for example, "FW450-1" in FIG. 7).

For example, the Link ID and the CHID (equal to the CH number) in the C-Plane path information are written in an integer format. In FIG. 7, the Link ID and the CHID are both "1". On the other hand, the Facility AID in the manually managed path information is written in a combination of the slot number and the port number, which is "3-1" in FIG. 7. The STSn AID in the manually managed path information is written with the channel number, which is "STS1" in FIG. 7.

In addition, the Call ID in the C-Plane path information is written in the IPv4 format, and is "1.1.1.1" in FIG. 7. The Connection IDs (Conn IDs) in the C-Plane path information are written in the IPv4 format, and are "1.1.1.1" to "5.5.5.5" in FIG. 7. On the other hand, in the manually managed path information, there is no information corresponding to the Call ID and the Conn IDs in the C-Plane path information (refer to "Not Applicable (NA)" in FIG. 7).

The POH adding section 14 byte-multiplexes and adds POH to the data to be transmitted to other node 1. The POH is generated, for example, by the apparatus control section 11. In this example, as described above, a multi-frame including a plurality of POHs is configured by the apparatus control section 11. The data to which POH is added by the POH adding section 14 is transmitted to the SOH/LOH adding section 15.

The SOH/LOH adding section 15 byte-multiplexes and adds SOH and LOH to the transmission data to which POH is added. The transmission frame to which SOH and LOH are added is transmitted to the byte multiplexer 16.

The byte multiplexer 16 byte-multiplexes the transmission frame which is transmitted to other node 1. The byte-multiplexed transmission frame is transmitted to the optical transmission IF section 17.

The optical transmission IF section 17 and the optical receiving IF section 18 have a function as an optical communication interface between a node 1 and the adjacent node 1. For example, the optical transmission IF section 17 converts the transmission frame byte-multiplexed by the byte multiplexer 16 into optical signals having a different wavelength for each channel, multiplexes the optical signals of different wavelengths, and transmits the optical signals to an optical fiber. On the other hand, the optical receiving IF section 18 receives a transmission frame from the adjacent node 1, demultiplexes into each wavelength, converts to electric signals, and transmits to the byte demultiplexer 19.

The byte demultiplexer 19 byte-demultiplexes the received transmission frame. The byte-demultiplexed transmission frame is transmitted to the SOH/LOH separation section 20.

The SOH/LOH separation section 20 separates SOH and LOH from each transmission frame which has been byte-demultiplexed. The data signal from which the SOH and LOH are separated is transmitted to the POH separation section 21.

The POH separation section 21 separates POH from the data signal from which the SOH and LOH are separated. The separated POH is transmitted to the apparatus control section 11.

(1.2) Start Node

Next, a case in which a node 1 functions as the start node of a path in a communication network will be described.

First, in the start node, the apparatus control section 11 sets a collection command in the command area of the above multi-frame, and the start node transmits the multi-frame to the adjacent node (a relay node or the end node) to inquire about the path setting information.

Responding to this inquiry, other node (a node other than the start node) sets the manually managed path information stored therein into a multi-frame and returns (transmits) the multi-frame to the start node.

The start node receives the manually managed path information stored by the other node.

In other words, the apparatus control section 11 of the start node functions as an example of a receiving section which receives the manually managed path information stored by other node on the path by inquiring about the path information from the other node.

In addition, the start node generates the C-Plane path information including information uniquely defined in the path, on the basis of the path setting information of other node on the path, by controlling of the apparatus control section 11 and the GMPLS control section 10.

In other words, the GMPLS control section 10 and the apparatus control section 11 of the start node function as an example of a generation section which generates the C-Plane path information including a parameter which is related to path setting and assigned by communication between nodes, on the basis of the received manually managed path information.

The start node sets the generated C-Plane path information into each data area in a multi-frame respectively, sets the execution command in the command area, and transmits (sends) the multi-frame to other node.

In other words, the apparatus control section 11 of the start node functions as an example of a transmission section which transmits the generated C-Plane path information to other node.

As described above, when a node 1 functions as the start node, the node 1 inquires about the manually managed path information stored by other node and receives the manually managed path information, and the node 1 generates the C-Plane path information on the basis of the manually managed path information. Thereafter, the generated C-Plane path information is transmitted to the other node, and the path setting information of the other node is replaced by (converted to) the C-Plane path information.

Now, the generation processing and the transmission processing of the C-Plane path information for the other node may be omitted in accordance with values of the C-Plane identification information included in a multi-frame received from the other node. So, it is unnecessary for other node already having the C-Plane path information regarding the path to generate and transmit the C-Plane path information.

Thereafter, it is possible to determine whether or not a completion notice (the first report) indicating that the C-Plane path information has been replaced in the other node is received within a predetermined time. For example, when the completion notice is not received from the other node within the predetermined time, the multi-frame including the execution command and the C-Plane path information generated for each node may be transmitted again.

On the other hand, when the completion notice is received from the other node within the predetermined time, the start node replaces the manually managed path information in the start node with the C-Plane path information, and a completion notice (the second report) indicating that the replacement has been completed may be transmitted to the other node. In the other node, when the completion notice is not received from the start node within a predetermined time, the other node may re-replace the replaced C-Plane path information by the original manually managed path information.

In this way, when the replacement to the C-Plane path information fails in any of the nodes on the path, data transmission is continued by re-replacing the replaced path setting information with the original manually managed path information.

(1.3) Relay Node

Next, a case in which a node 1 functions as a relay node on a path in the communication network will be described.

The relay node receives the multi-frame from the adjacent node (the start node, the end node or other adjacent node) by processing of the optical receiving IF section 18, the byte demultiplexer 19 and the SOH/LOH separation section 20. Thereafter, contents of the multi-frame are checked by the POH separation section 21 and the apparatus control section 11.

As a result of the check, when the collection command is set in the command area of the received multi-frame, since the relay node is not the end node, the received multi-frame is passed (through) to the adjacent node on the end node side. Whether the node is the end node or not is determined from the area for the connection destination apparatus number and the area for the connection destination IF number set in the first four bytes of the multi-frame.

On the other hand, when the reply command is set in the command area of the received multi-frame, the relay node checks contents of the path setting information held (stored) in the C-Plane path information holding section 12 and the manually managed path information holding section 13 by controlling of the apparatus control section 11. When the manually managed path information regarding the path is held, the apparatus control section 11 sets the manually managed path information (TID, Facility AID, STSn AID and the like) held by the relay node into the data area (areas for Node ID, Link ID, the CH number and the like) assigned to the relay node in the multi-frame, and returns the multi-frame to the adjacent node on the start node side.

In other words, the apparatus control section 11 of the relay node functions as an example of a transmission section which transmits the manually managed path information held by (stored in) the relay node to the start node. When the C-Plane path information is already held as the path setting information regarding the path, information (for example, flag "1") indicating that the C-Plane path information is already held may be set in the C-Plane identification information in the data area, and the multi-frame may be returned to the adjacent node on the start node side.

When receiving a multi-frame in which the execution command is set from the start node, the relay node checks the C-Plane path information addressed to the relay node set in the multi-frame by controlling of the apparatus control section 11. The relay node replaces the manually managed path information held (stored) in the manually managed path information holding section 13 with the C-Plane path information addressed to the relay node set in the multi-frame, and transmits the multi-frame to the end node side.

In other words, the apparatus control section 11 of the relay node functions as an example of a receiving section which receives the C-Plane path information which the start node generates on the basis of the transmitted manually managed path information, and functions as an example of a control section which replaces the manually managed path information held by (stored in) the relay node with the received C-Plane path information.

As described above, when a node 1 functions as a relay node, the relay node transmits the manually managed path information held by (stored in) the relay node to the start node by using a multi-frame. When receiving the C-Plane path information generated by the start node by using a multi-frame, the relay node replaces the manually managed path information regarding the path held by (stored in) the relay node with the received C-Plane path information.

For example, when completing the replacement processing of the path setting information, the relay node may transmit a completion notice (the first report) indicating that the replacement processing has been completed to the start node.

When the relay node does not receive a completion notice (the second report) which is transmitted from the start node and indicates that the replacement in the start node is completed within a predetermined time, the relay node may re-replace the replaced C-Plane path information with the original manually managed path information.

(1.4) End Node

Next, a case in which a node 1 functions as the end node of a path in a communication network will be described.

The end node receives a multi-frame from the adjacent node (a relay node or the start node) by processing of the optical receiving IF section 18, the byte demultiplexer 19 and the SOH/LOH separation section 20. Thereafter, contents of the received multi-frame are checked by processing of the POH separation section 21 and the apparatus control section 11. As a result of the check, when the collection command is set in the command area of the received multi-frame, since the node is the end node, the manually managed path information held by the node is set in the data area assigned to the node in the multi-frame. Thereafter, the end node sets the reply command in the command area, and returns the multi-frame to the adjacent node on the start node side. Whether the node is the end node or not is determined, in the same way as the relay node, from the area for the connection destination apparatus number and the area for the connection destination IF number set in the first four bytes of the multi-frame.

In other words, the apparatus control section 11 of the end node functions as an example of a transmission section which transmits the manually managed path information held by the end node to the start node. When the C-Plane path information is already held as the path setting information regarding the path, information (for example, flag "1") indicating that the C-Plane path information is already held may be set in the C-Plane identification information in the data area, and the multi-frame may be returned to the adjacent node on the start node side.

When receiving a multi-frame in which the execution command is set from the relay node on the start node side, the end node checks the C-Plane path information addressed to the end node set in the multi-frame by controlling of the apparatus control section 11. The end node replaces contents of the manually managed path information holding section 13 with the C-Plane path information addressed to the end node set in the multi-frame.

In other words, the apparatus control section 11 of the end node functions as an example of a receiving section which receives the C-Plane path information which the start node generates on the basis of the transmitted manually managed path information, and functions as an example of a control section which replaces the manually managed path information held by (stored in) the end node with the received C-Plane path information.

As described above, when a node 1 functions as the end node, the end node transmits the manually managed path information held by the end node to the start node, on the basis of the multi-frame in which the collection command is set by the start node. In addition, the end node receives the C-Plane path information generated by the start node, and replaces the manually managed path information held by the end node with the received C-Plane path information.

In the same way as the relay node, when completing the replacement processing of the path setting information, the end node may transmit a completion notice (the first report) indicating that the replacement processing has been completed to the start node.

When the end node does not receive a completion notice (the second report) which is transmitted from the start node and indicates that the replacement in the start node is completed within a predetermined time, the end node may re-replace the replaced C-Plane path information with the original manually managed path information.

(1.5) Operation Example

Here, an operation example of the above communication network will be described with reference to FIGS. 8 to 20.

Figure 8A:
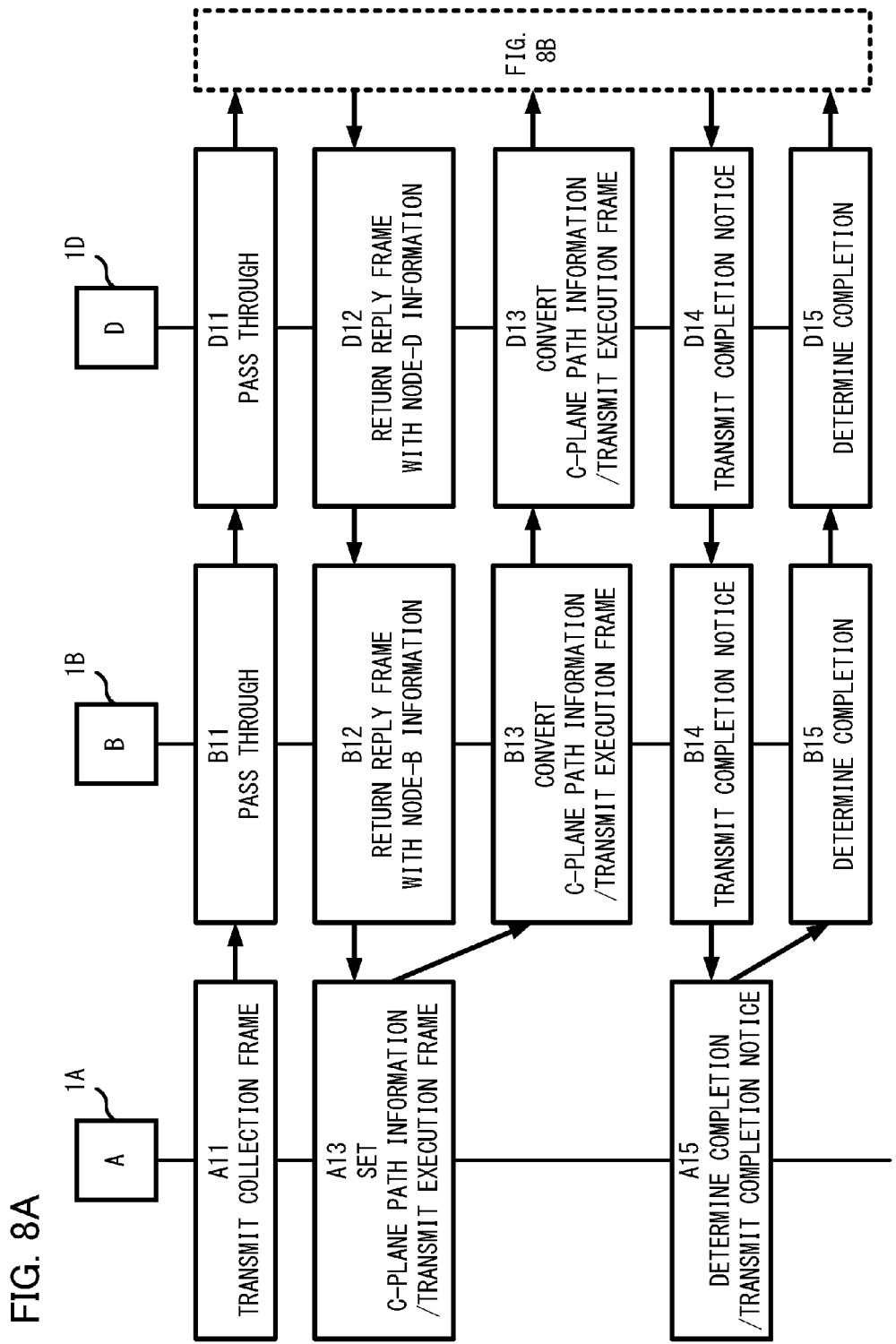
FIGS. 8A and 8B are diagrams illustrating an example of a communication control operation according to an embodiment.
Figure 8B:
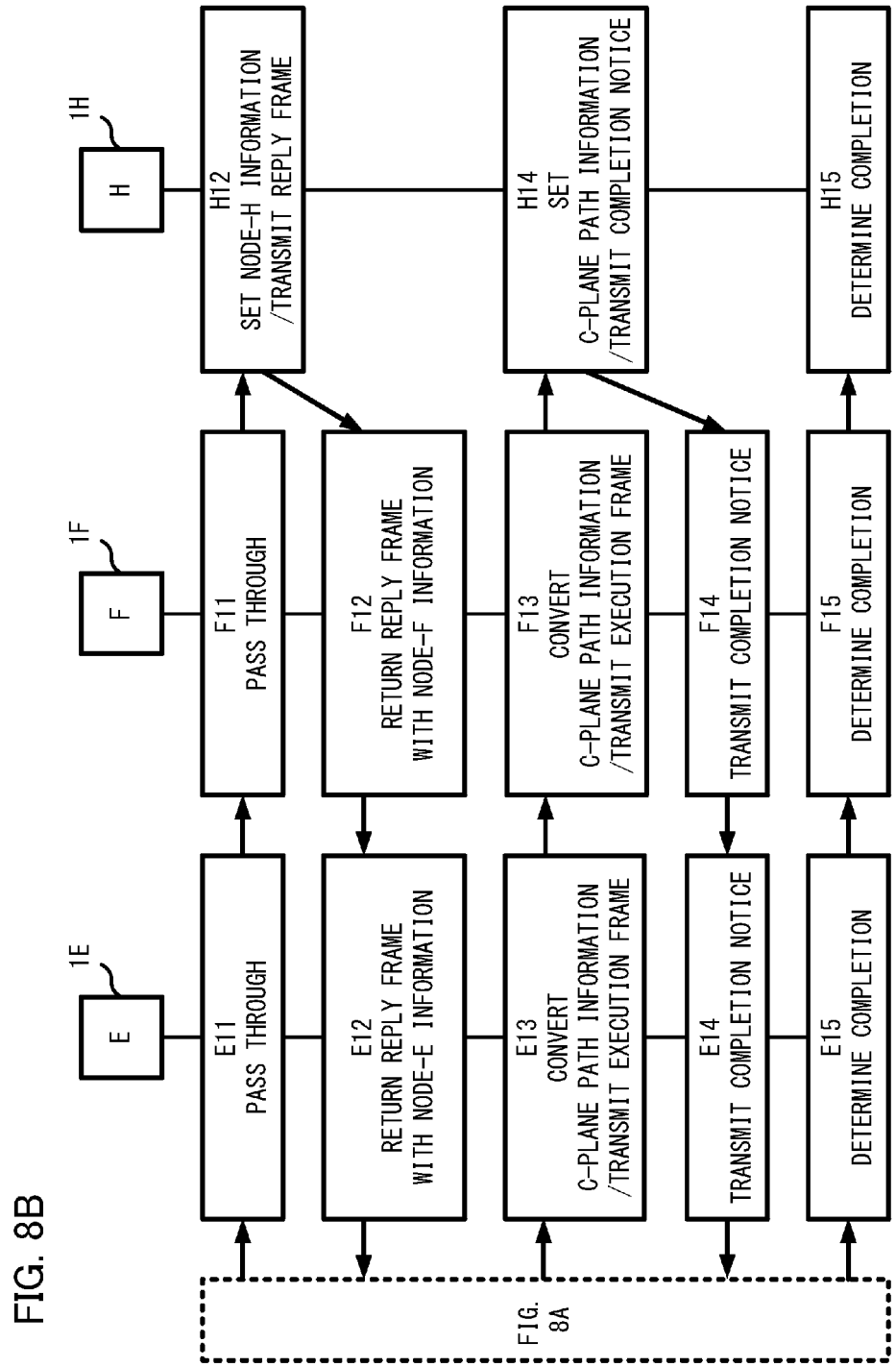

FIGS. 8A to 8B are diagrams illustrating an example of a communication control operation according to the embodiment.

FIGS. 9 to 12 are diagrams illustrating signal transmission paths corresponding to a path setting control method according to the embodiment.

FIGS. 13 to 18 are flowcharts illustrating an example of an operation in each node 1.

FIGS. 19 to 20 are diagrams illustrating a conversion example of the path setting information.

Figure 13:
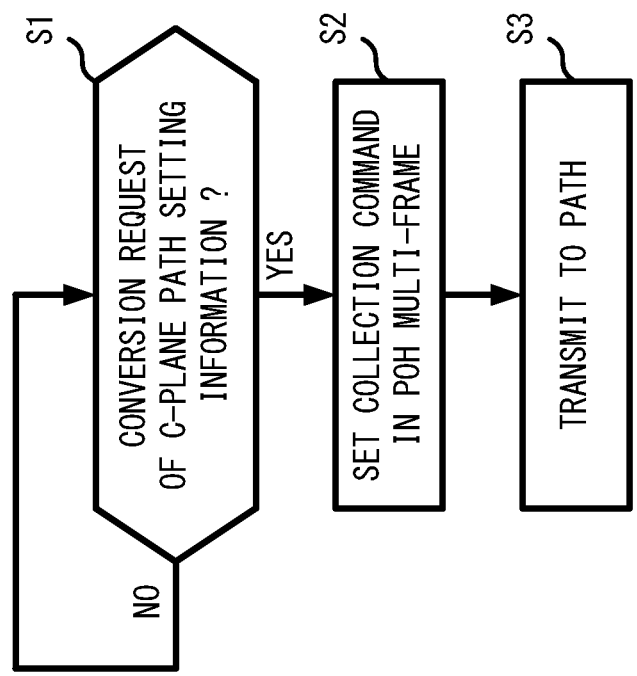
FIG. 13 is a flowchart illustrating an example of an operation of a start node.

First, the start node 1A determines whether or not a conversion request of the path setting information is received from a network administrator or the like (step S1 in FIG. 13).

When the start node 1A determines that the conversion request of the path setting information is received (Yes branch of step S1 in FIG. 13), the start node 1A sets the collection command in the command area in a multi-frame configured by a plurality of POHs (step S2 in FIG. 13).

Thereafter, the start node 1A transmits the multi-frame (collection frame) in which the collection command is set to the adjacent node 1B (step S3 in FIG. 13, refer to reference symbol A11 in FIG. 8A).

When the start node 1A determines that the conversion request of the path setting information is not received (No branch of step S1 in FIG. 13), the start node 1A may wait until the conversion request is received.

Figure 14:
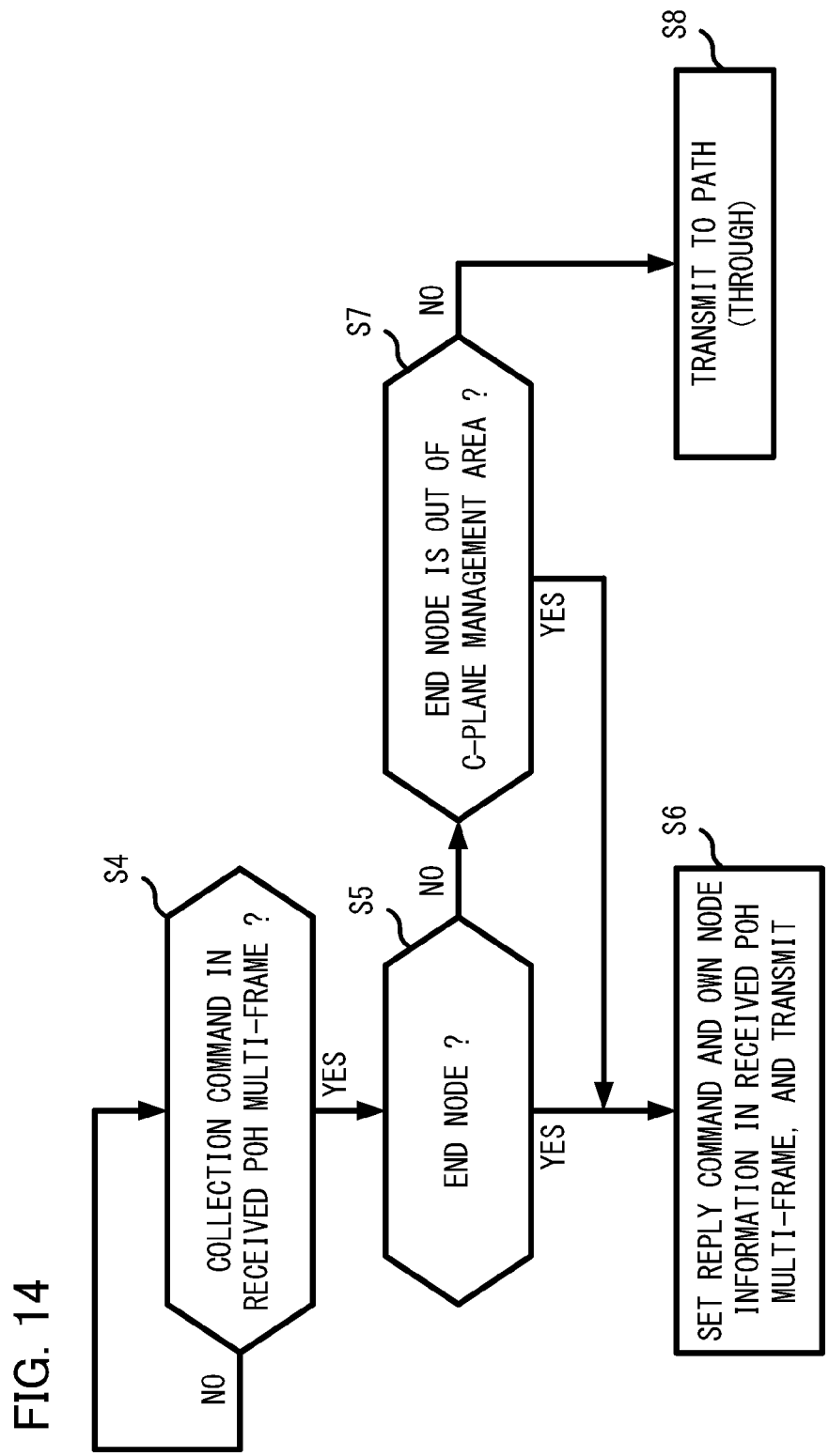
FIG. 14 is a flowchart illustrating an example of an operation of a relay node and an end node.

Next, the relay node 1B determines whether the collection command is set in the multi-frame received from the adjacent node (the start node 1A) on the start node side (step S4 in FIG. 14).

When the multi-frame is not received (No branch of step S4 in FIG. 14), for example, the relay node 1B waits without doing anything.

On the other hand, when the relay node 1B determines that the collection command is set in the multi-frame received from the start node 1A (Yes branch of step S4 in FIG. 14), the relay node 1B determines whether or not the node 1B is the end node on the path (step S5 in FIG. 14).

Whether the node 1B is the end node or not may be determined from, for example, the area for the connection destination apparatus number and the area for the connection destination IF number set in the first four bytes of the multi-frame.

Here, since the relay node 1B is not the end node (No branch of step S5 in FIG. 14), the node 1B determines whether or not the end node side of the node 1B is out of a C-Plane management area (step S7 in FIG. 14).

Whether or not the end node side of the node 1B is out of the C-Plane management area may be determined from, for example, the area for the connection destination apparatus number and the area for the connection destination IF number set in the first four bytes of the multi-frame.

Since the end node side of the relay node 1B is within the C-Plane management area (No branch of step S7 in FIG. 14), the relay node 1B transmits (passes) the collection frame to the adjacent node 1D on the end node side on a set path (step S8 in FIG. 14, refer to reference symbol B11 in FIG. 8A).

For example, when the node 1B is not the end node, and the end node side is out of the C-Plane management area (Yes branch of step S7 in FIG. 14), the node 1B sets the reply command and the manually managed path information of the relay node in the multi-frame and returns the multi-frame to the adjacent node on the start node side (step S6 in FIG. 14).

In the relay nodes 1D, 1E and 1F, in the same way as in the node 1B, the collection frame received from the start node is passed through to the adjacent nodes 1E, 1F and 1H on the end node side (refer to reference symbols D11, E11 and F11 in FIGS. 8A to 8B).

Figure 9A:
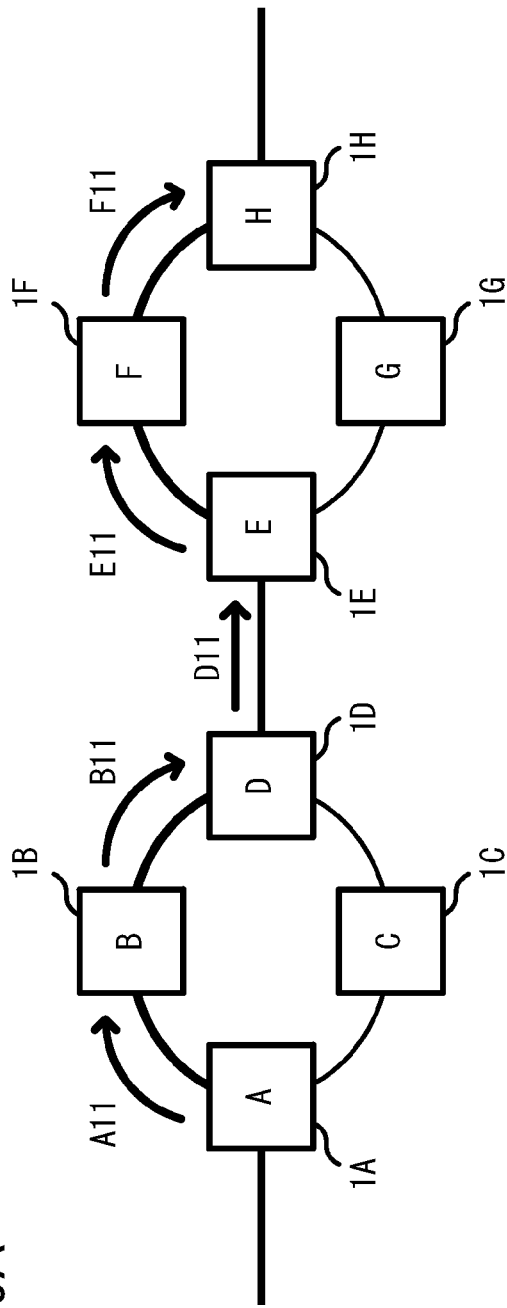
FIG. 9A is a diagram illustrating an example of a signal transmission path corresponding to a path setting control method according to an embodiment.
Figure 9B:
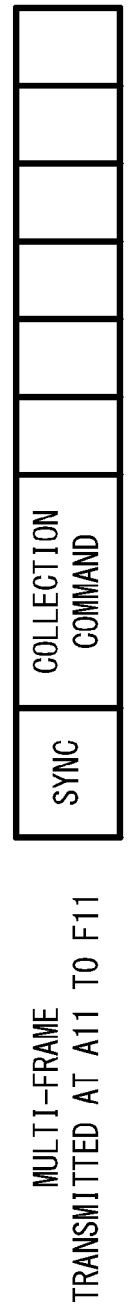
FIG. 9B is a diagram illustrating an example of a multi-frame.

FIG. 9A is a diagram illustrating an example of a signal transmission path related to the processes indicated by reference symbols A11 to F11 in FIGS. 8A to 8B, and FIG. 9B is a diagram illustrating contents of the multi-frame.

As illustrated in FIG. 9A, the collection frame transmitted from the start node 1A passes through the relay nodes 1B to 1F on the path and arrives at the end node 1H. At this time, in the collection frame, as illustrated in FIG. 9B, a synchronization signal (SYNC) and the collection command are set, but there is no information in the other data area (for example, all "1's" are set).

Next, the end node 1H which receives the collection command from the relay node 1F determines whether the collection command is set in the received multi-frame (step S4 in FIG. 14).

When the multi-frame is not received (No branch of step S4 in FIG. 14), for example, the end node 1H waits without doing anything.

On the other hand, when it is determined that the collection command is set in the multi-frame received from the relay node 1F (Yes branch of step S4 in FIG. 14), the end node 1H determines whether or not the end node 1H is the end node on the path (step S5 in FIG. 14).

Here, since the node 1H is the end node (Yes branch of step S5 in FIG. 14), the node 1H sets the reply command in the multi-frame. Further, the end node 1H sets the manually managed path information (TID, Facility AID, STSn AID and the like) of the end node 1H in the multi-frame, and returns the multi-frame to the adjacent node 1F on the start node side (step S6 in FIG. 14, refer to reference symbol H12 in FIG. 8B).

Figure 15:
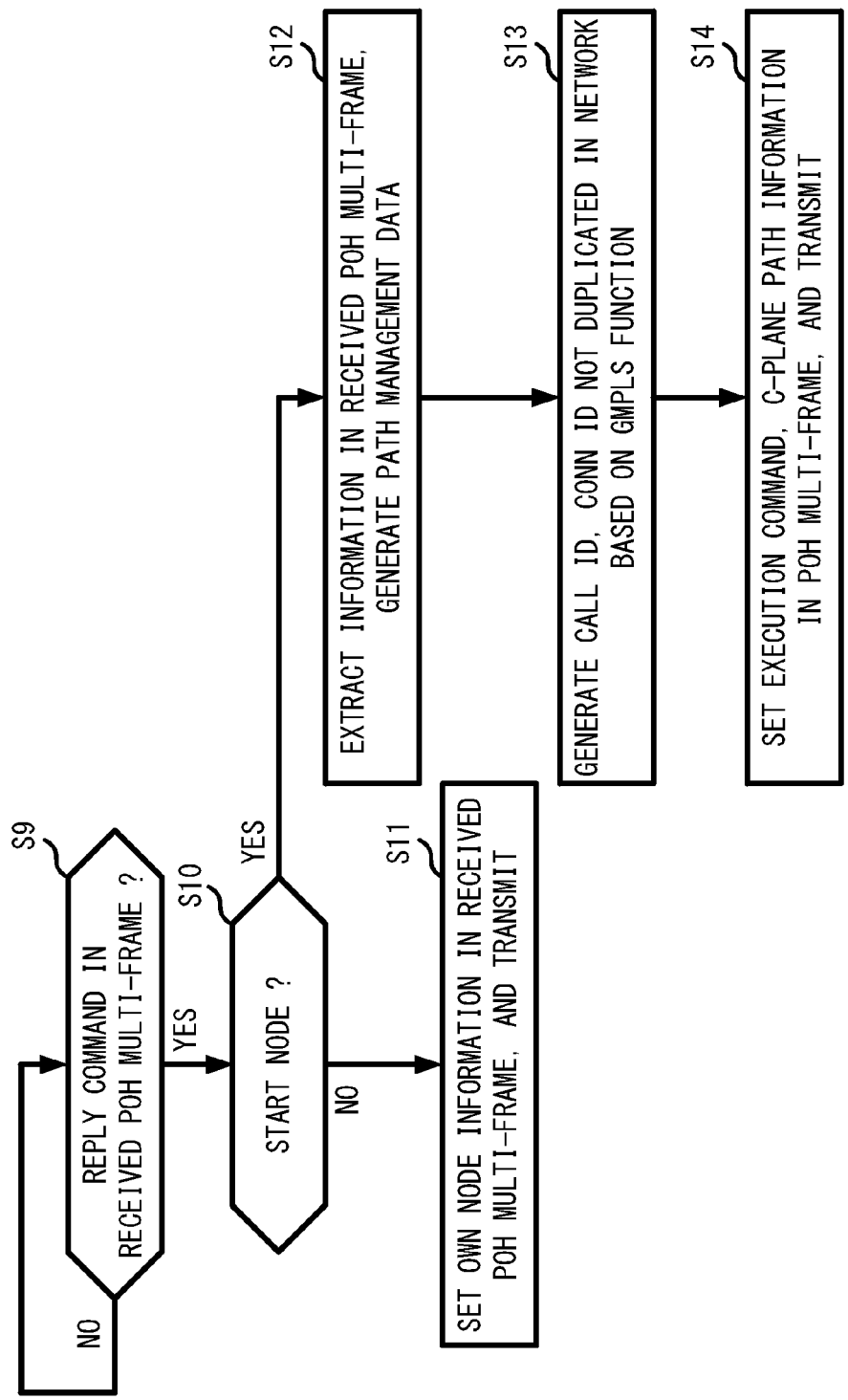
FIG. 15 is a flowchart illustrating an example of an operation of the relay node and the start node.

The relay node 1F which receives the reply frame from the end node 1H determines whether or not the reply command is set in the received multi-frame (step S9 in FIG. 15).

When the reply frame is not received (No branch of step S9 in FIG. 15), for example, the relay node 1F waits without doing anything.

On the other hand, when determining that the reply command is set in the received multi-frame (Yes branch of step S9 in FIG. 15), the relay node 1F determines whether or not the relay node 1F is the start node (step S10 in FIG. 15).

Here, since the node 1F is not the start node (No branch of step S10 in FIG. 15), the node 1F sets the manually managed path information of the node 1F in the data area assigned to the node 1F in the multi-frame, and transmits the multi-frame to the start node side (step S11 in FIG. 15, refer to reference symbol F12 in FIG. 8B).

In the same way as the node 1F, the relay nodes 1E, 1D and 1B cumulatively set the manually managed path information held by (stored in) the nodes 1E, 1D and 1B in the data areas assigned to the nodes 1E, 1D and 1B in the multi-frame respectively. Thereafter, the nodes 1E, 1D and 1B transmit the multi-frame to the adjacent nodes 1D, 1B, 1A on the start node side (refer to reference symbols E12, D12, and B12 in FIGS. 8A to 8B).

Figure 10A:
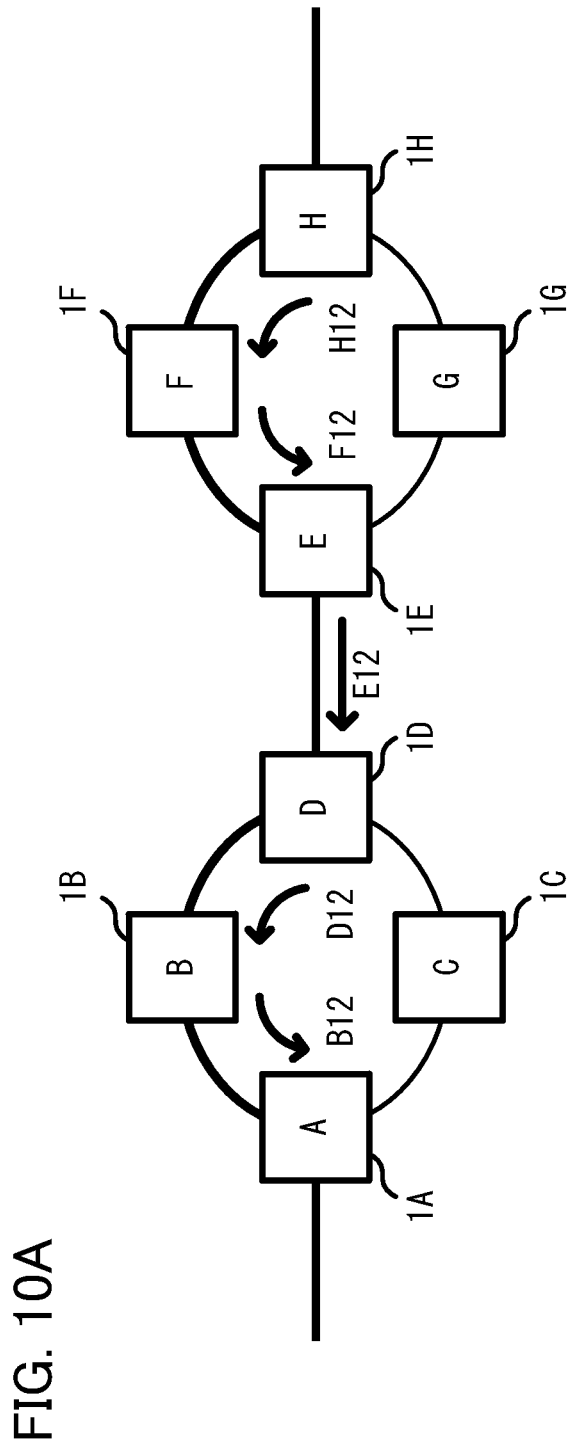
FIG. 10A is a diagram illustrating an example of a signal transmission path corresponding to a path setting control method according to an embodiment.

FIG. 10A is a diagram illustrating an example of a signal path related to the processes indicated by reference symbols H12 to B12 in FIGS. 8A to 8B and FIG. 10B is a diagram illustrating contents of the multi-frame.

As illustrated in FIG. 10A, the reply frame transmitted from the end node 1H arrives at the start node 1A via the relay nodes 1F to 1B. At this time, the nodes 1H to 1B cumulatively set the manually managed path information (TID, Facility AID, STSn AID and the like) of the nodes 1H to 1B in the reply frame.

For example, as illustrated in FIG. 10B, in the processing indicated by reference symbol H12 in FIG. 8B, the end node 1H sets the reply command in the command area of the multi-frame, and sets the manually managed path information of the end node 1H in the data area following the command area, and thereafter, transmits the multi-frame to the adjacent node 1F. For example, the end node 1H sets TID, Facility AID and STSn AID of the end node 1H in the data areas for Node ID, Link ID and the CH number respectively. When the node 1H already has the C-Plane path information regarding the path, a flag "1" or the like may be set in the C-Plane identification information.

Next, in the processing indicated by reference symbol F12 in FIG. 8B, for example, the relay node 1F sets the manually managed path information of the relay node 1F in the data area following the data area assigned to the end node 1H, and transmits the multi-frame to the adjacent node 1E on the start node side.

Thereafter, in the same way as the above, the relay nodes 1E, 1D and 1B cumulatively sets the manually managed path information of the relay nodes 1E, 1D and 1B in the multi-frame received from the end node side.

Next, the start node 1A which receives the reply frame from the relay node 1B determines whether or not the reply command is set in the received multi-frame (step S9 in FIG. 15).

When the reply frame is not received (No branch of step S9 in FIG. 15), for example, the start node 1A waits without doing anything.

On the other hand, when it is determined that the reply command is set in the received multi-frame (Yes branch of step S9 in FIG. 15), the node 1A determines whether or not the node 1A is the start node (step S10 in FIG. 15).

Here, since the node 1A is the start node (Yes branch of step S10 in FIG. 15), the node 1A extracts the manually managed path information set cumulatively by the nodes 1B, 1D, 1E, 1F and 1H in the multi-frame.

Thereafter, the node 1A generates the path management data on the basis of the manually managed path information held by (stored in) the node 1A and the extracted manually managed path information (step S12 in FIG. 15).

Next, for example, the node 1A generates the C-Plane path information (Node ID, Link ID, the CH number, Call ID and Conn ID) for the nodes 1B to 1H on the basis of the manually managed path information, which is included in the management data, transmitted from the nodes 1A to 1H on the path (step S13 in FIG. 15). To generate the C-Plane path information, the GMPLS function included in the GMPLS control section 10 may be used.

For example, the start node 1A assigns numbers to the Call IDs and Conn IDs so that the numbers are not duplicated in the network, and assigns numbers to Link IDs corresponding to optical port numbers of Facility AID so that the numbers are not duplicated in each node, on the basis of the above management data. Next, for example, the start node 1A assigns the CH numbers corresponding to STSn AID so that the numbers are not duplicated in Link ID, and uses Node IDs uniquely defined in the network.

The start node 1A sets the generated C-Plane path information in the data areas assigned to each node in the multi-frame, and sets the execution command in the command area. Thereafter, the start node 1A transmits the multi-frame (execution frame) in which the execution command is set to the adjacent node 1B on the end node side (step S14 in FIG. 15, refer to reference symbol A13 in FIG. 8A).

Figure 16:
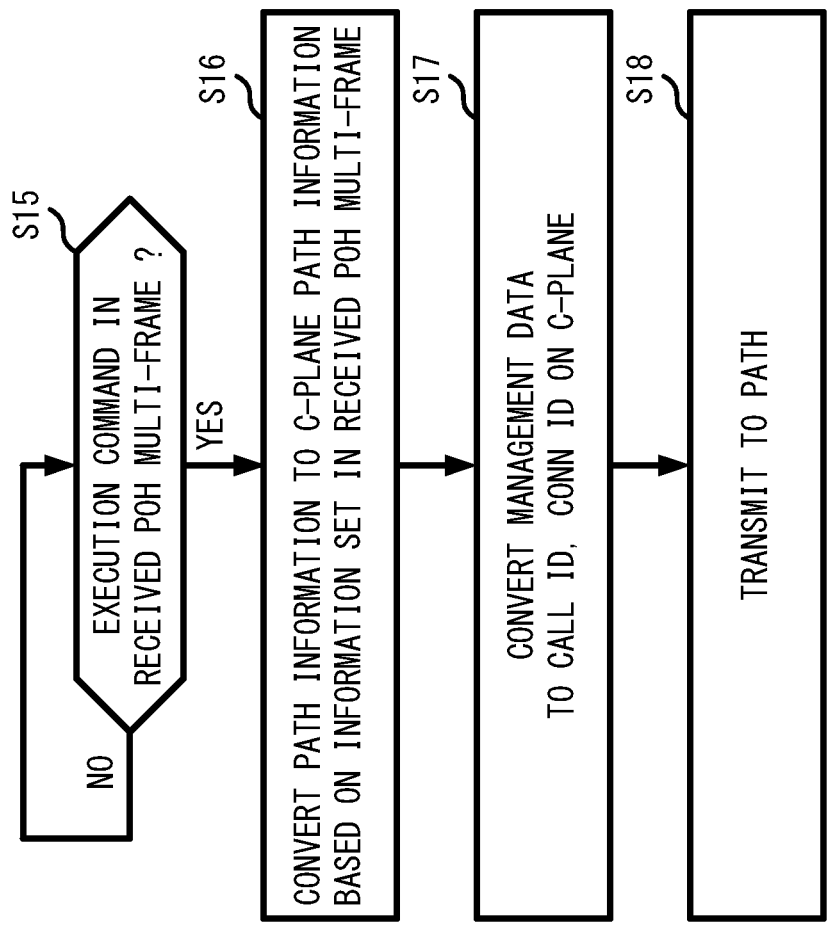
FIG. 16 is a flowchart illustrating an example of an operation of the relay node and the end node.

Next, the relay node 1B determines whether or not the execution command is set in the received multi-frame (step S15 in FIG. 16).

When the execution frame is not received (No branch of step S15 in FIG. 16), for example, the relay node 1B waits without doing anything.

On the other hand, when the relay node 1B determines that the execution command is set in the received multi-frame (Yes branch of step S15 in FIG. 16), the relay node 1B determines whether or not the C-Plane path information for the relay node 1B is set in the data area assigned to the relay node 1B in the execution frame. When there is the C-Plane path information for the relay node 1B, the relay node 1B replaces the manually managed path information held by the relay node 1B with the C-Plane path information (step S16 in FIG. 16, refer to reference symbol B13 in FIG. 8A).

At this time, the management data may be converted to a connection defined by Call ID and Conn ID on the C-Plane (step S17 in FIG. 16).

Thereafter, the relay node 1B transmits the execution frame to the adjacent node 1D on the end node side (step S18 in FIG. 16).

In the same way as the relay node 1B, the relay nodes 1D, 1E and 1F determine whether the execution command is set in the received multi-frame (Yes branch of step S15).

On the basis of the determination results, the relay nodes 1D, 1E and 1F replace the manually managed path information held by the relay nodes 1D, 1E and 1F by using the C-Plane path information set in the data areas assigned to the relay nodes 1D, 1E and 1F in the execution frame respectively (step S16 in FIG. 16, refer to reference symbols D13, E13 and F13 in FIGS. 8A to 8B).

Thereafter, the relay nodes 1D, 1E and 1F convert the management data into the C-Plane path (step S17 in FIG. 16), and transmit the execution frame to the adjacent nodes 1E, 1F and 1H respectively on the end node side (step S18 in FIG. 16).

Figure 11A:
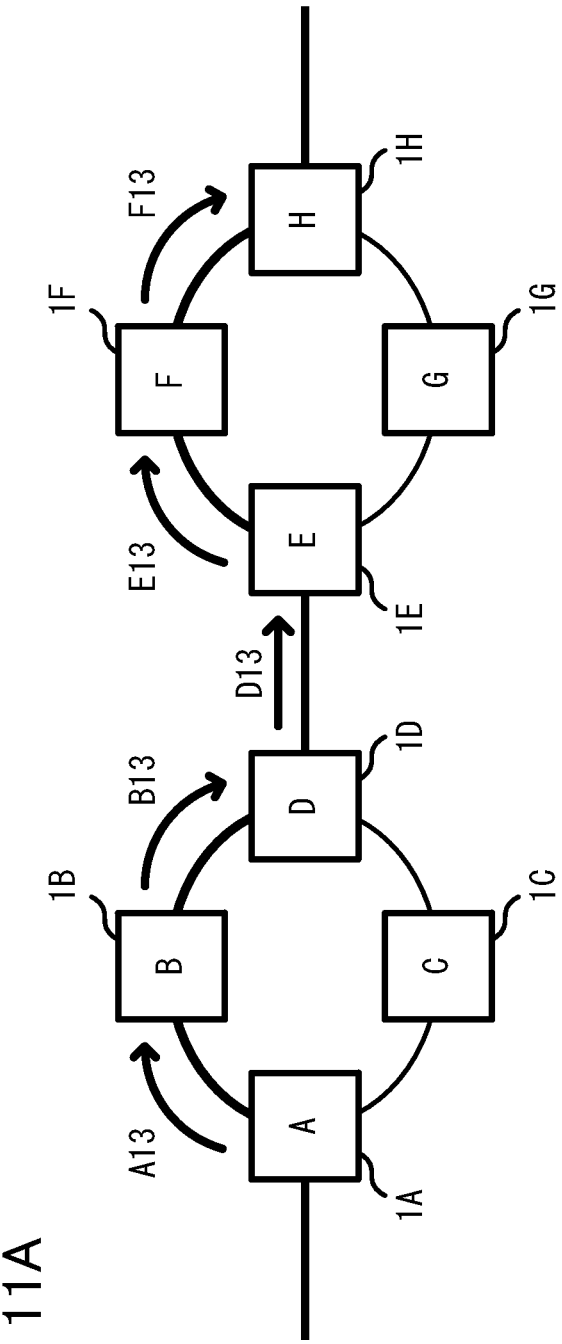
FIG. 11A is a diagram illustrating an example of a signal transmission path corresponding to a path setting control method according to an embodiment.
Figure 11B:
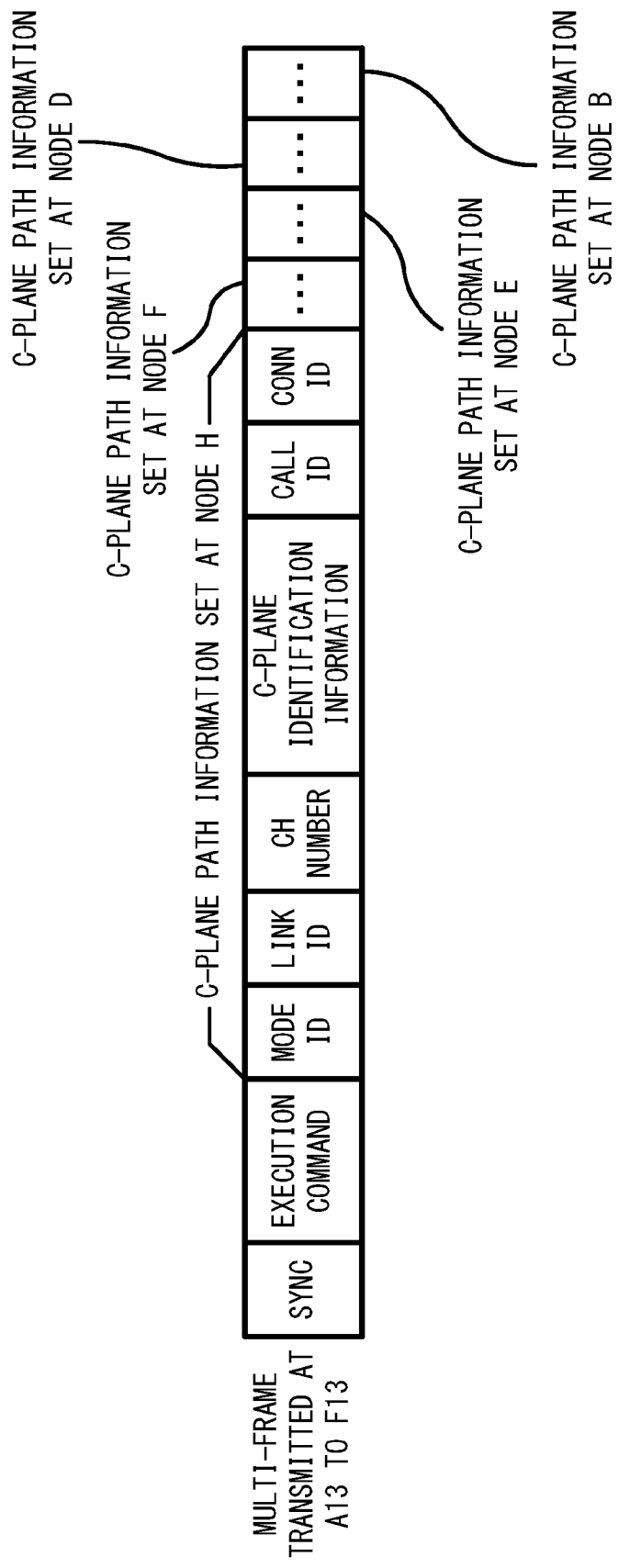
FIG. 11B is a diagram illustrating an example of a multi-frame.

FIG. 11A is a diagram illustrating an example of a signal path related to the processing indicated by reference symbols A13 to F13 in FIGS. 8A to 8B, and FIG. 11B is a diagram illustrating contents of the multi-frame.

As illustrated in FIG. 11A, the execution frame transmitted from the start node 1A arrives at the end node 1H via the relay nodes 1B to 1F on the path.

As illustrated in FIG. 11B, for example, the C-Plane path information for the nodes 1B to 1H on the path is set in the execution frame. The C-Plane identification information may be omitted from the execution frame.

The end node 1H which receives the execution frame from the relay node 1F determines whether the execution command is set in the received multi-frame (Yes branch of step S15 in FIG. 16).

When there is the C-Plane path information for the end node 1H, the end node 1H replaces the manually managed path information held by the end node 1H with the C-Plane path information (step S16 in FIG. 16).

At this time, the management data may be converted to a connection defined by Call ID and Conn ID on the C-Plane (step S17 in FIG. 16).

Figure 17:
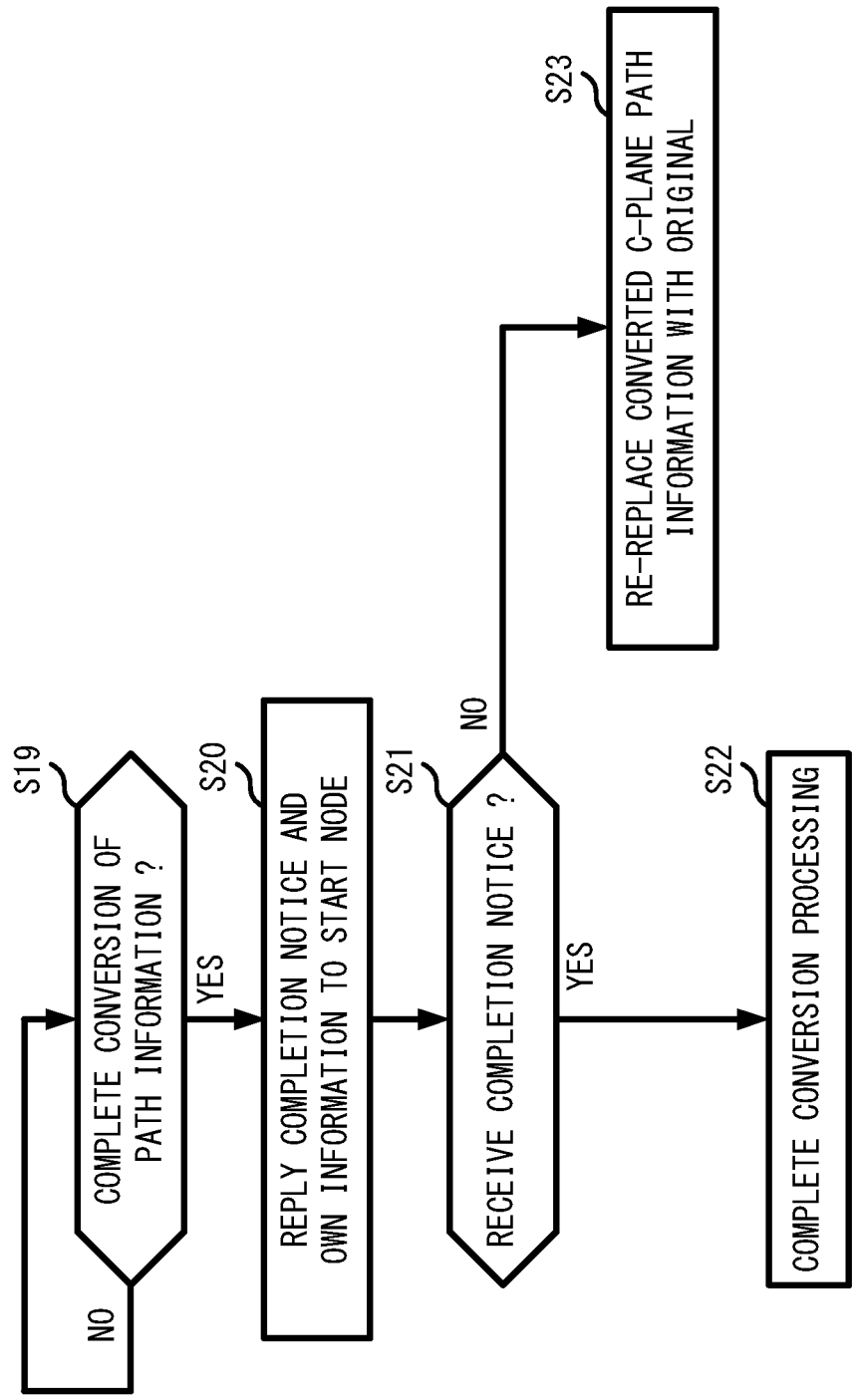
FIG. 17 is a flowchart illustrating an example of an operation of the relay node and the end node.

Thereafter, the end node 1H determines whether or not the replacement to the C-Plane path information is completed (step S19 in FIG. 17).

The end node 1H waits until the conversion to the C-Plane path information is completed (No branch of step S19 in FIG. 17), for example, waits until the conversion is completed.

On the other hand, when the conversion to the C-Plane path information is completed (Yes branch of step S19 in FIG. 17), the end node 1H transmits the C-Plane path information of the end node 1H and a completion notice indicating that the replacement is completed to the start node side (step S20 in FIG. 17, refer to reference symbol H14 in FIG. 8B).

In the same way as the end node 1H, the relay nodes 1F to 1B determine whether or not the replacement in the respective node is completed (step S19 in FIG. 17), and transmit the C-Plane path information of the respective node and the completion notice to the start node side (step S20 in FIG. 17, refer to reference symbols F14, E14, D14 and B14 in FIG. 8A to 8B).

Figure 18:
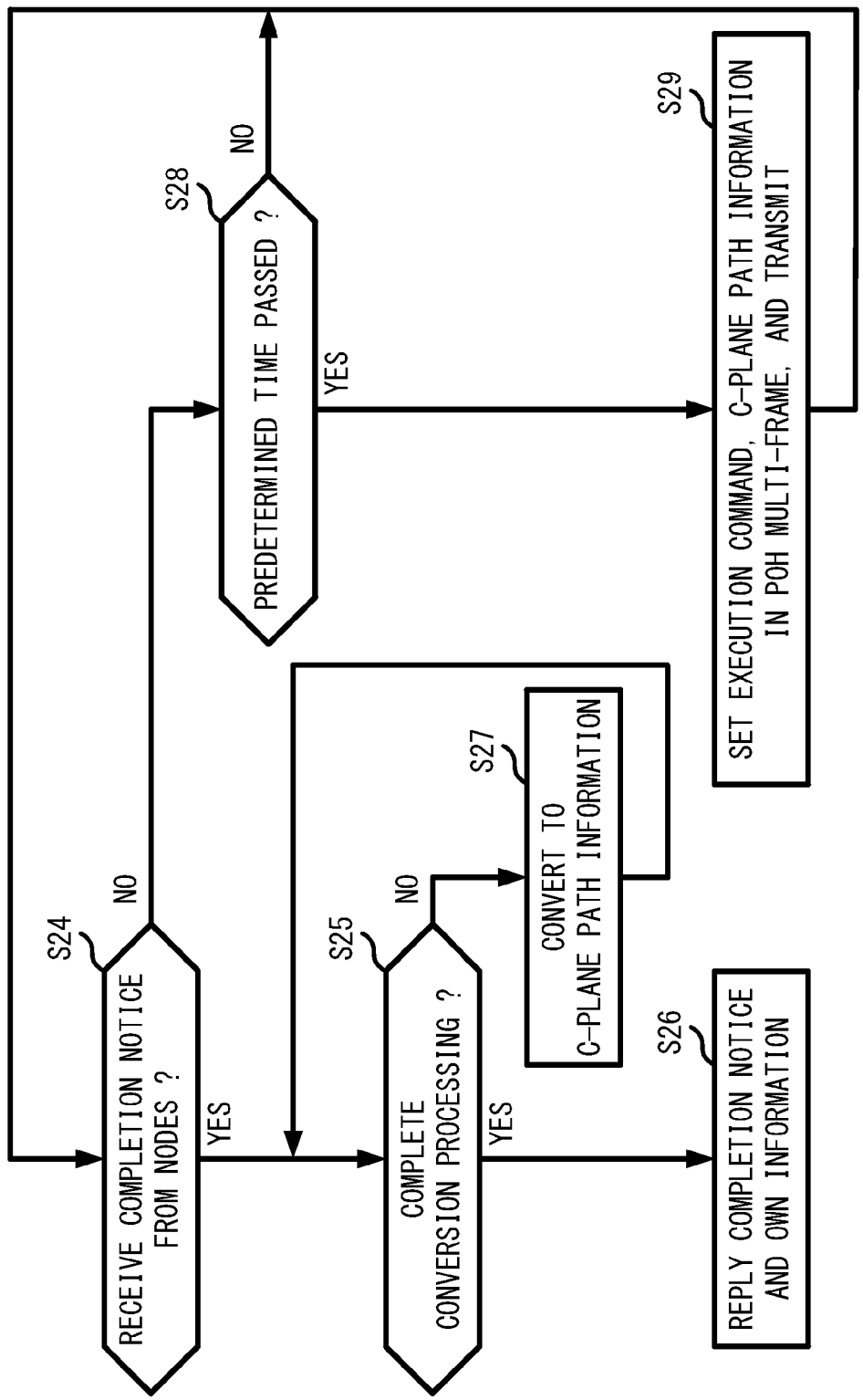
FIG. 18 is a flowchart illustrating an example of an operation of the start node.

The start node 1A determines whether or not the completion notices are received from the relay nodes 1B to 1F and the end node 1H (step S24 in FIG. 18).

When the completion notices are not received (No branch of step S24 in FIG. 18), the start node 1A, further, determines whether or not a predetermined time has passed (step S28 in FIG. 18).

Here, when the predetermined time has not yet passed (No branch of step S28 in FIG. 18), the start node 1A waits for the completion notices from the nodes 1B to 1H.

When the completion notices is received within the predetermined time (Yes branch of step S24 in FIG. 18), the start node 1A determines whether or not the conversion processing to the C-Plane path information is completed in the start node 1A (step S25 in FIG. 18).

When the conversion is not completed (No branch of step S25 in FIG. 18), the start node 1A converts the manually managed path information held by (stored in) the start node 1A to the C-Plane path information (step S27 in FIG. 18).

On the other hand, when the replacement in the start node 1A is completed (Yes branch of step S25 in FIG. 18), by using the C-Plane path information, the start node 1A transmits a completion notice indicating that the replacement is completed and the C-Plane path information of the start node 1A, to the other nodes 1B to 1H (step S26 in FIG. 18, refer to reference symbol A15 in FIG. 8A).

On the other hand, when the completion notices from the nodes 1B to 1H are not received within the predetermined time (Yes branch of step S28 in FIG. 18), the start node 1A re-transmits the execution frame including the C-Plane path information for the other nodes 1B to 1H (step S29 in FIG. 18).

Next, the relay nodes 1B to 1F and the end node 1H determine whether or not the completion notice indicating that the conversion to the C-Plane path information is completed is received from the start node 1A within a predetermined time (step S21 in FIG. 17).

When the completion notice from the node 1A is received within the predetermined time (Yes branch of step S21 in FIG. 17), the relay nodes 1B to 1F and the end node 1H complete the conversion processing to the C-Plane path information (step S22 in FIG. 17, refer to reference symbols B15, D15, E15, F15 and H15 in FIGS. 8A to 8B).

On the other hand, when the completion notice is not received from the node 1A within the predetermined time (No branch of step S21 in FIG. 17), the relay nodes 1B to 1F and the end node 1H re-replace the converted C-Plane path information with the original manually managed path information (step S23 in FIG. 17).

Figure 12:
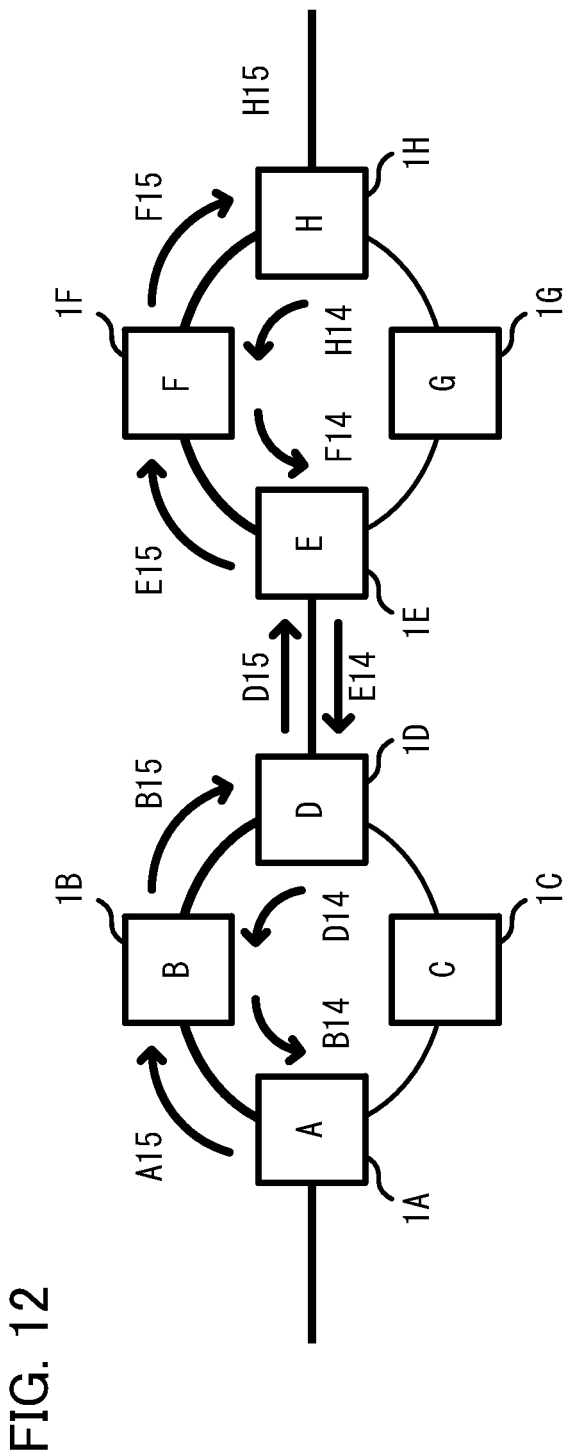
FIG. 12 is a diagram illustrating an example of a signal transmission path corresponding to a path setting control method according to an embodiment.

FIG. 12 is a diagram illustrating an example of a signal path related to the processes indicated by reference symbols H14 to B14 in FIGS. 8A to 8B and reference symbols A15 to H15 in FIGS. 8A to 8B.

As illustrated in FIG. 12, the completion notices from the end node 1H and relay nodes 1F, 1E, 1D and 1B are transmitted to the start node 1A respectively. On the other hand, the completion notice from the start node 1A is transmitted to the relay nodes 1B, 1D, 1E and 1F and the end node 1H. When transmitting the completion notice, not only the above described multi-frame may be used, but also the replaced C-Plane path information may be used to transmit the completion report on the C-Plane.

For example, when the node 1A, the node 1B and the node 1D have the path setting information (the manually managed path information and the C-Plane path information) illustrated in FIGS. 19A to 19C, it is possible to change the path setting information to the path setting information illustrated in FIGS. 20A to 20C by performing the above described communication control.

For example, in the example illustrated in FIGS. 19A and 20A, in the manually managed path information of the node 1A, the manually managed path information in which Facility AID is "3-1-1 (From side ID), 4-1-1 (To side ID)" and STSn ID is "STS1" is replaced by the C-Plane path information in which Node ID is "192.168.1.0", Link ID is "1", the CH number is "3", Call ID is "1.1.1.1", and Conn ID is "3.3.3.3".

In the example illustrated in FIGS. 19B and 20B, in the manually managed path information of the node 1B, the manually managed path information in which Facility AID is "3-1-1 (From side ID), 4-1-1 (To side ID)" and STSn ID is "STS1" is replaced by the C-Plane path information in which Node ID is "192.168.1.1", Link ID is "1", the CH number is "3", Call ID is "1.1.1.1", and Conn ID is "3.3.3.3".

In the example illustrated in FIGS. 19C and 20C, in the manually managed path information of the node 1D, the manually managed path information in which Facility AID is "3-1-1 (From side ID), 4-1-1 (To side ID)" and STSn ID is "STS1" is replaced by the C-Plane path information in which Node ID is "192.168.1.2", Link ID is "1", the CH number is "3", Call ID is "1.1.1.1", and Conn ID is "3.3.3.3".

As described above, when using the path setting control method of the embodiment, it is possible to replace (convert) the path setting information of each node 1 on the path from the manually managed path information to the C-Plane path information. As a result, the path setting information having a different format is converted efficiently.

Second Embodiment

In the embodiment described above, the start node 1A generates and transmits the C-Plane path information on the basis of the manually managed path information received from the other nodes 1B to 1H, so that the conversion to the C-Plane path information is performed. In this embodiment, for example, each node 1H to 1A generates the C-Plane path information individually.

(2.1) End Node

In this embodiment, a case in which a node 1 functions as the end node of a path over a communication network will be described.

The end node receives a multi-frame from the adjacent node (a relay node or the start node) by processing of the optical receiving IF section 18, the byte demultiplexer 19 and the SOH/LOH separation section 20.

Thereafter, the end node checks contents of the received multi-frame by processing of the POH separation section 21 and the apparatus control section 11.

As a result of the check, when the collection command is set in the command area of the received multi-frame, since the node is the end node, the C-Plane path information of the end node is generated by the GMPLS control section 10.

By controlling of the apparatus control section 11, the end node replaces the manually managed path information with the generated C-Plane path information, sets the generated C-Plane path information in the data area assigned to the end node in the multi-frame, sets the reply command in the command area, and transmits the multi-frame to the start node side.

At this time, the end node may return the completion notice indicating that the replacement is normally completed via the C-Plane.

As described above, whether the node is the end node or not may be determined from the area for the connection destination apparatus number and the area for the connection destination IF number set in the first four bytes of the multi-frame.

In other words, the apparatus control section 11 of the end node of this embodiment functions as an example of a control section which replaces the manually managed path information held by (stored in) the end node with the C-Plane path information, and a transmission section which transmits the replaced C-Plane path information to the adjacent node.

When the end node already has the C-Plane path information as the path setting information regarding the path, the end node may set information (for example, flag "1") indicating that the C-Plane path information is already held in the C-Plane identification information in the data area, and returns the multi-frame to the adjacent node on the start node side.

(2.2) Relay Node

Next, a case in which a node 1 functions as a relay node on a path over the communication network will be described.

The relay node receives the multi-frame from the adjacent node (the start node, the end node or other adjacent node) by processing of the optical receiving IF section 18, the byte demultiplexer 19 and the SOH/LOH separation section 20.

Thereafter, the relay node checks contents of the received multi-frame by processing of the POH separation section 21 and the apparatus control section 11.

As a result of the check, when the collection command is set in the command area of the received multi-frame, since the node is not the end node, the multi-frame is passed (through) to the adjacent node on the end node side without change.

Whether the node is the end node or not may be determined, in the same way as the end node, from the area for the connection destination apparatus number and the area for the connection destination IF number set in the first four bytes of the multi-frame.

On the other hand, when the reply command is set in the command area of the received multi-frame, the relay node extracts the C-Plane path information having already been set (used) in other nodes (the end node, the other relay nodes) from the data area of the received multi-frame by controlling of the apparatus control section 11.

Thereafter, by controlling of the apparatus control section 11, the relay node generates the C-Plane path information which is different from the C-Plane path information having been already used, and replaces the manually managed path information of the relay node with the generated C-Plane path information.

Furthermore, by controlling of the apparatus control section 11, the relay node sets the generated C-Plane path information in the data area assigned to the relay node in the multi-frame, and transmits the multi-frame to the start node side.

At this time, the relay node may return the completion notice indicating that the replacement is normally completed to the start node side via the C-Plane.

In other words, the apparatus control section 11 of the relay node of this embodiment functions as an example of a receiving section which receives the C-Plane path information from one or more other nodes (the end node or the other relay nodes) located on the end node side in the path.

Also, the apparatus control section 11 of this embodiment functions as an example of a control section which replaces the manually managed path information held by (stored in) the relay node with the C-Plane path information which is different from the received C-Plane path information.

Furthermore, the apparatus control section 11 of this embodiment functions as an example of a transmission section which transmits the replaced C-Plane path information to the start node side along with the received C-Plane path information.

When the C-Plane path information is already held as the path setting information regarding the path, information (for example, flag "1") indicating that the C-Plane path information is already held may be set in the C-Plane identification information in the data area, and the multi-frame may be returned to the adjacent node on the start node side.

(2.3) Start Node

Next, a case in which a node 1 functions as the start node of a path over a communication network will be described.

The start node sets the collection command in a multi-frame configured by a plurality of POHs, and transmits the multi-frame to the adjacent node (a relay node or the end node) by processing of the apparatus control section 11.

As described above, the end node and the relay node generate and set the C-Plane path information of each node after receiving the collection frame, cumulatively set the generated C-Plane information in the reply frame, and transmit the reply frame to the start node.

The start node receives the C-Plane path information which have been generated and used by other nodes and cumulatively transmitted from the end node side, by controlling of the apparatus control section 11.

Also, by controlling of the apparatus control section 11, the start node extracts the C-Plane path information having already been set (used) in the other nodes (the end node, the relay nodes) from the data area of the received multi-frame.

Thereafter, by controlling of the apparatus control section 11, the start node generates the C-Plane path information which is different from the C-Plane path information having already been used in the other nodes, and replaces the manually managed path information of the start node with the generated C-Plane path information.

Furthermore, by controlling of the apparatus control section 11, the start node sets the generated C-Plane path information in the data area assigned to the start node in the multi-frame. At this time, the start node may return the completion notice indicating that the replacement is normally completed to the end node side via the C-Plane.

In other words, the apparatus control section 11 of the start node of this embodiment functions as an example of a receiving section which receives the C-Plane path information from one or more other nodes (the end node or the relay nodes) located on the end node side in the path.

Also, the apparatus control section 11 of this embodiment functions as an example of a control section which replaces the manually managed path information held by the start node with the C-Plane path information which is different from the received C-Plane path information.

As described above, in this embodiment, since each node recognizes the C-Plane path information which has already been used in other nodes, the nodes generate the C-Plane path information individually, and replace the manually managed path information with the C-Plane path information. In this way, more efficient processing and simple communication control are realized.

(2.4) Operation Example

Here, an operation example of the communication network of this embodiment will be described with reference to FIGS. 21 to 24.

FIGS. 21A to 21B are diagrams illustrating an example of a communication control operation of this embodiment.

Figure 22A:
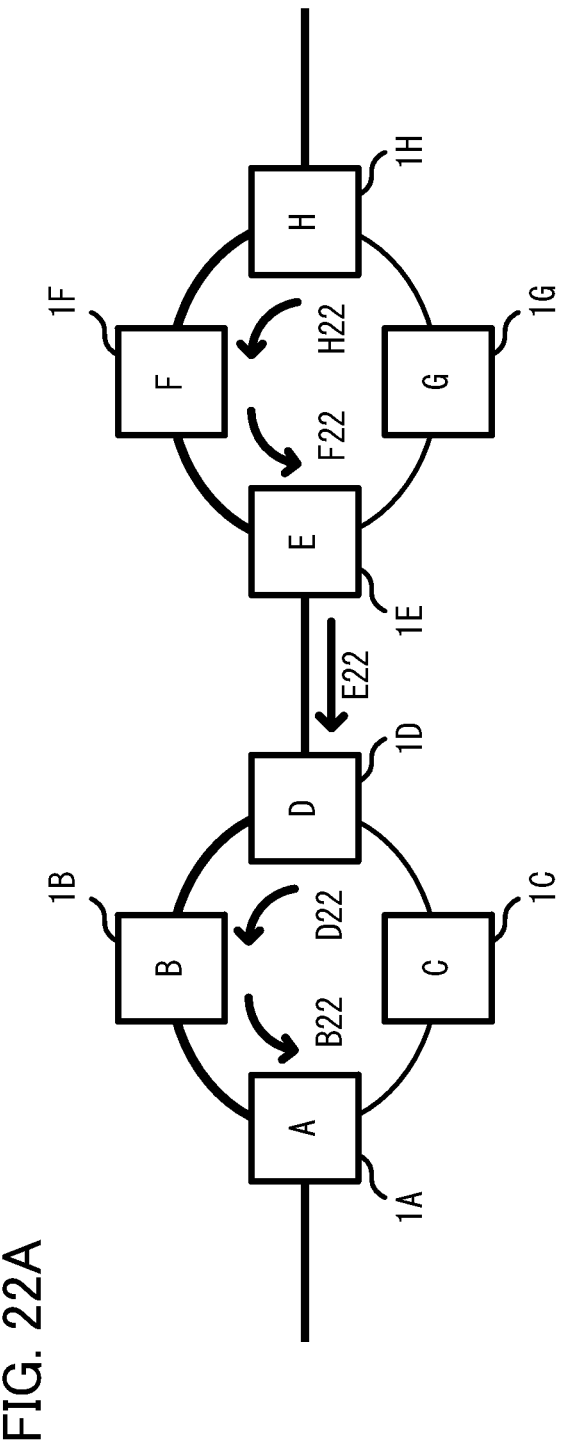
FIG. 22A is a diagram illustrating an example of a signal transmission path corresponding to a path setting control method according to the second embodiment.

FIGS. 22A to 22B are diagrams illustrating a signal transmission path according to the path setting control method of this embodiment.

Figure 23:
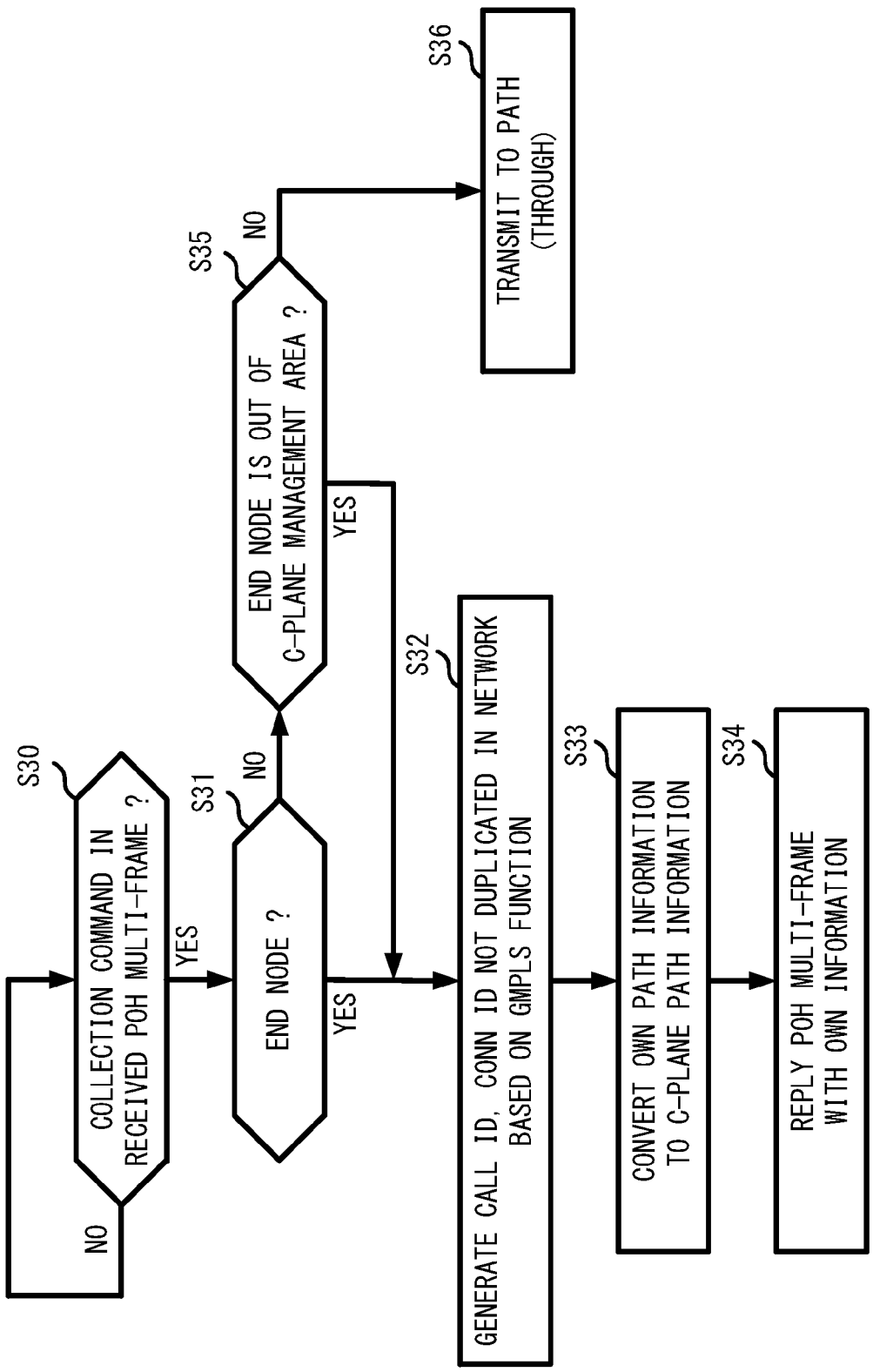
FIG. 23 is a flowchart illustrating an example of an operation of the relay node and the end node.
Figure 24A:
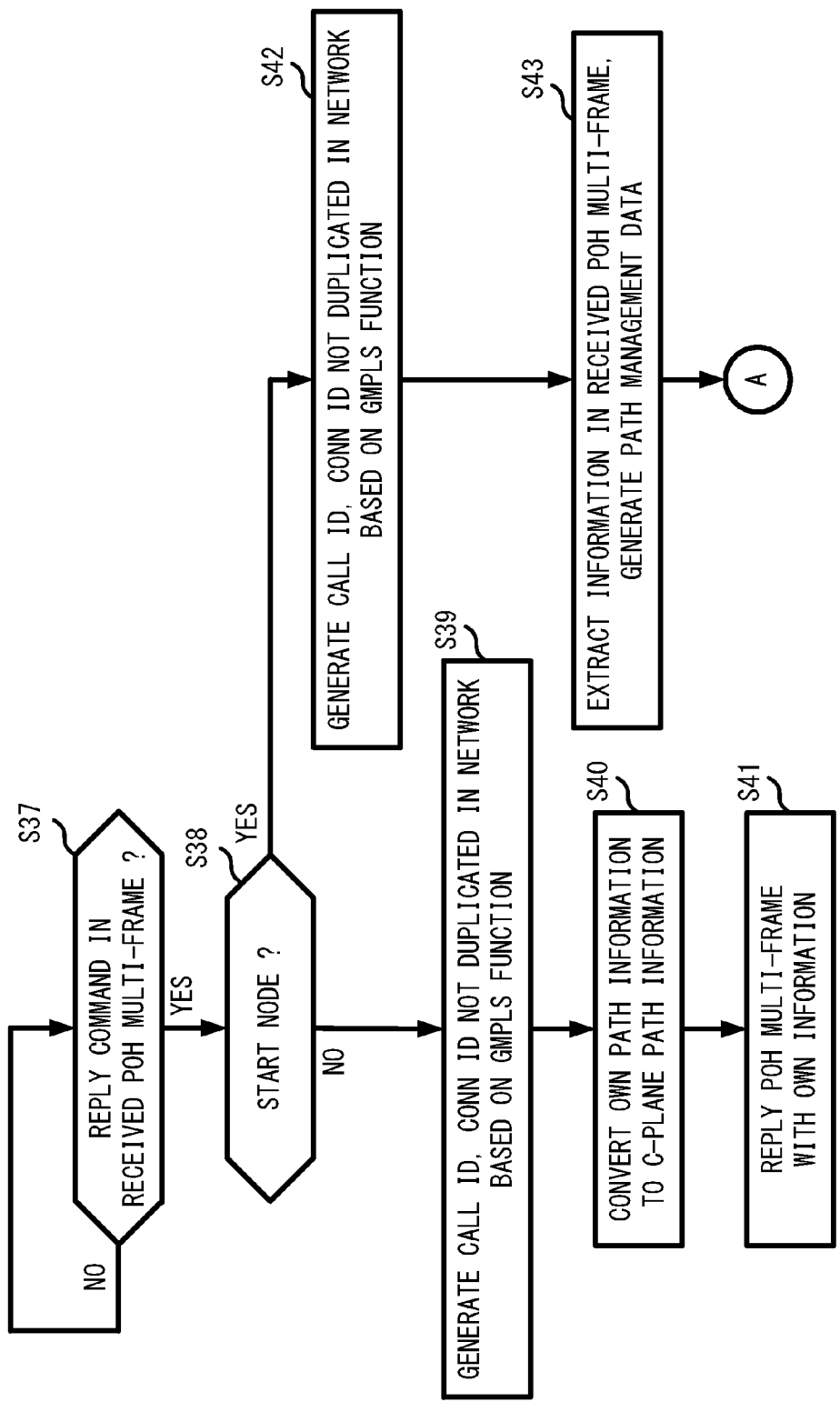
FIGS. 24A and 24B are flowcharts illustrating an example of an operation of the relay node and the start node.
Figure 24B:
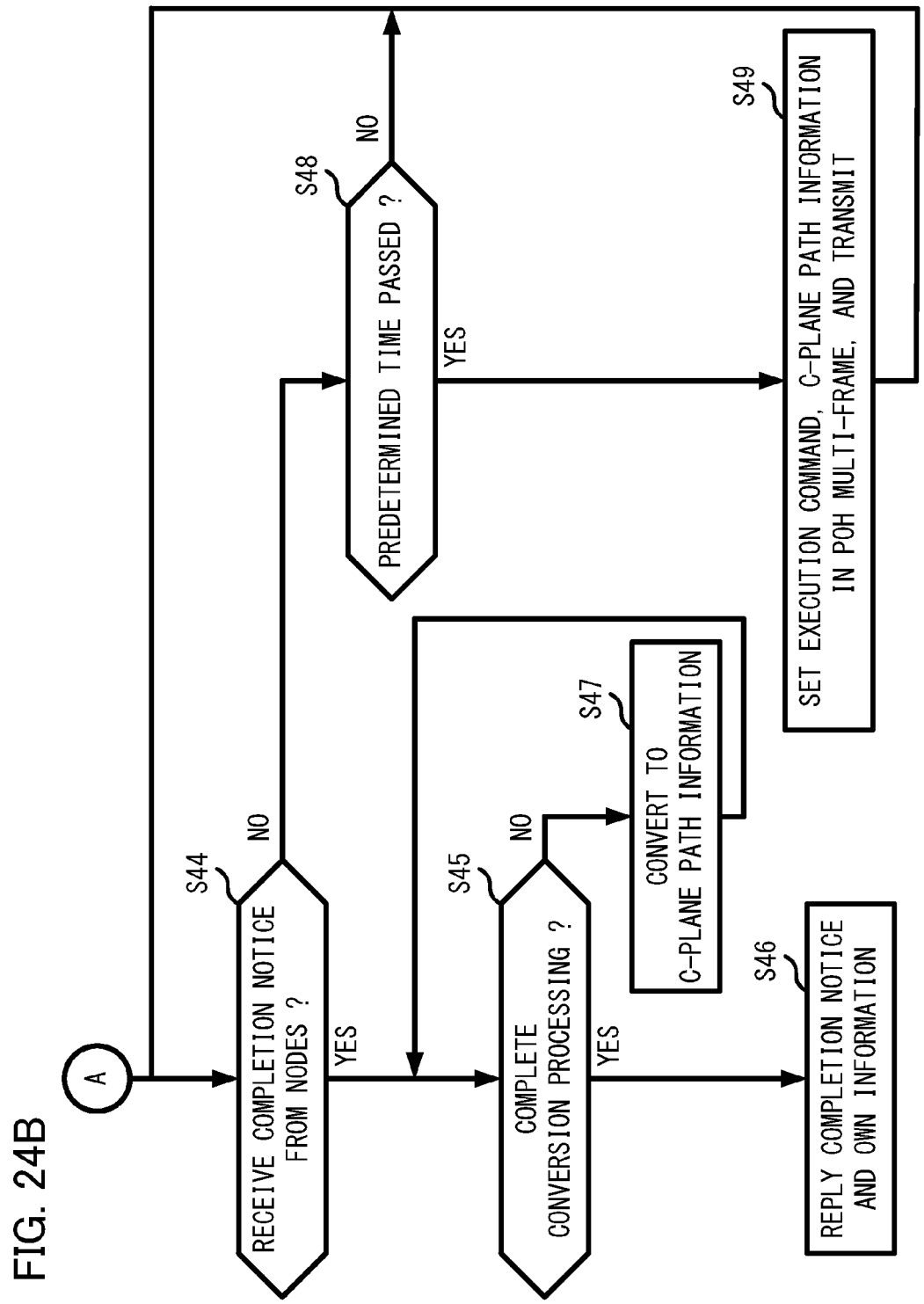

FIGS. 23, 24A and 24B are flowcharts illustrating an operation example in each node 1.

First, the start node 1A sets the collection command in the command area in a multi-frame configured by a plurality of POHs when receiving a conversion request of the path setting information from a network administrator or the like.

Thereafter, the start node 1A transmits the multi-frame (collection frame) in which the collection command is set to the adjacent node 1B (refer to reference symbol A21 in FIG. 21A).

Next, the relay node 1B determines whether the collection command is set in the multi-frame received from the adjacent node (the start node 1A) on the start node side (step S30 in FIG. 23).

When the multi-frame is not received (No branch of step S30 in FIG. 23), for example, the relay node 1B waits without doing anything. On the other hand, when the relay node 1B determines that the collection command is set in the multi-frame received from the start node 1A (Yes branch of step S30 in FIG. 23), the node 1B determines whether or not the node 1B is the end node on the path (step S31 in FIG. 23).

Whether the node 1B is the end node or not may be determined from, for example, the area for the connection destination apparatus number and the area for the connection destination IF number set in the first four bytes of the multi-frame.

Here, since the relay node 1B is not the end node (No branch of step S31 in FIG. 23), the node 1B determines whether or not the end node side of the node 1B is out of the C-Plane management area (step S35 in FIG. 23).

Whether or not the end node side of the node 1B is out of the C-Plane management area may be determined from, for example, the area for the connection destination apparatus number and the area for the connection destination IF number set in the first four bytes of the multi-frame.

In this embodiment, since the end node side of the relay node 1B is within the C-Plane management area (No branch of step S35 in FIG. 23), the relay node 1B transmits (passes through) the collection frame to the adjacent node 1D on the end node side on the set path (step S36 in FIG. 23, refer to reference symbol B21 in FIG. 21A).

For example, when the node 1B is not the end node, and the end node side is out of the C-Plane management area (Yes branch of step S35 in FIG. 23), the node 1B generates the C-Plane path information by using the GMPLS control section 10 (step S32 in FIG. 23).

Thereafter, by controlling of the apparatus control section 11, the node 1B replaces the manually managed path information of the node 1B regarding the path with the generated C-Plane path information (step S33 in FIG. 23), set the C-Plane path information generated by the node 1B in the multi-frame, and transmit the multi-frame to the start node side (step S34 in FIG. 23).

In the relay nodes 1D, 1E and 1F, in the same way as in the node 1B, for example, the collection frame received from the start node is passed through to the adjacent nodes 1E, 1F and 1H on the end node side respectively (refer to reference symbols D21, E21 and F21 in FIGS. 21A to 21B).

Next, the end node 1H which receives the collection command from the relay node 1F determines whether the collection command is set in the received multi-frame (step S30 in FIG. 23).

When the multi-frame is not received (No branch of step S30 in FIG. 23), for example, the end node 1H waits without doing anything.

On the other hand, when determining that the collection command is set in the multi-frame received from the relay node 1F (Yes branch of step S30 in FIG. 23), the node 1H determines whether or not the node 1H is the end node on the path (step S31 in FIG. 23).

Here, since the node 1H is the end node (Yes branch of step S31 in FIG. 23), the node 1H generates the C-Plane path information by using the GMPLS control section 10 (step S32 in FIG. 23).

Thereafter, by controlling of the apparatus control section 11, the node 1H replaces the manually managed path information of the node 1H regarding the path with the generated C-Plane path information (step S33 in FIG. 23), sets the C-Plane path information generated by the node 1H in the multi-frame, and transmits the multi-frame to the start node side (step S34 in FIG. 23, refer to reference symbol H22 in FIG. 21B).

At this time, when the replacement to the C-Plane path information is normally completed, the end node 1H may return the completion notice indicating that the replacement is normally completed to the start node side.

The relay node 1F which receives the reply frame from the end node 1H determines whether or not the reply command is set in the received multi-frame (step S37 in FIG. 24).

When the reply frame is not received (No branch of step S37 in FIG. 24), for example, the relay node 1F waits without doing anything.

On the other hand, when determining that the reply command is set in the received multi-frame (Yes branch of step S37 in FIG. 24), the relay node 1F determines whether or not the node 1F is the start node (step S38 in FIG. 24).

Here, since the node 1F is not the start node (No branch of step S38 in FIG. 24), the node 1F generates the C-Plane path information different from the C-Plane path information which is set in the received multi-frame and has already been used in other node on the end node side (step S39 in FIG. 24).

Thereafter, by controlling of the apparatus control section 11, the node 1F replaces the manually managed path information of the node 1F regarding the path with the generated C-Plane path information (step S40 in FIG. 24), cumulatively sets the C-Plane path information generated by the node 1B in the multi-frame, and transmits the multi-frame to the start node side (step S41 in FIG. 24, refer to reference symbol F22 in FIG. 21B).

At this time, when the replacement to the C-Plane path information is normally completed, the relay node 1F may return the completion notice indicating that the replacement is normally completed to the start node side.

In the relay nodes 1E, 1D and 1B, in the same way as in the node 1F, on the basis of the received multi-frame, the C-Plane path information different from the C-Plane path information having been used in the nodes on the end node side is generated.

Thereafter, the relay nodes 1E, 1D and 1B replace the manually managed path information of the respective nodes regarding the path with the generated C-Plane path information, and cumulatively set the generated C-Plane path information in the reply frame, and respectively transmit the reply frame to the start node side (refer to reference symbols E22, D22 and B22 in FIGS. 21A to 21B).

In addition, for example, when the replacement to the C-Plane path information is normally completed, the relay nodes 1E, 1D and 1B return the completion notice indicating that the replacement is normally completed to the start node 1A.

FIG. 22A is a diagram illustrating an example of a signal path related to the processing indicated by reference symbols H22 to B22 in FIGS. 21A to 21B, and FIG. 22B is a diagram illustrating contents of the multi-frame.

As illustrated in FIG. 22A, the reply frame transmitted from the end node 1H passes through the relay nodes 1F to 1B while collecting the C-Plane path information generated in each node, and arrives at the start node 1A.

For example, as illustrated in FIG. 22B, in the processing indicated by reference symbol H22 in FIG. 21B, the end node 1H sets the reply command in the command area of the multi-frame, and sets the C-Plane path information of the end node 1H in the data area following the command area, and thereafter, transmits the multi-frame to the adjacent node 1F.

When the node 1H already has the C-Plane path information regarding the path, a flag "1" or the like may be set in the C-Plane identification information.

Next, in the processing indicated by reference symbol F22 in FIG. 21B, for example, the relay node 1F checks to the data area assigned to the end node 1H in the received multi-frame, and extracts the C-Plane path information having already been used.

Thereafter, the relay node 1F generates the C-Plane path information different from the C-Plane path information having already been used, and replaces the manually managed path information of the relay node 1F with the generated C-Plane path information.

Furthermore, the relay node 1F cumulatively sets the generated C-Plane path information in the data area assigned to the relay node 1F in the reply frame, and transmits the reply frame to the adjacent node 1E on the start node side.

In the same way as the above, the relay nodes 1E, 1D and 1B generate the C-Plane path information different from the C-Plane path information having already been used, and replace the manually managed path information of the respective nodes with the generated C-Plane path information.

Thereafter, the relay nodes 1E, 1D and 1B cumulatively sets the generated C-Plane path information in the reply frame, and respectively transmit the reply frame to the adjacent nodes on the start node side.

Next, the start node 1A which receives the reply frame from the relay node 1B determines whether or not the reply command is set in the received multi-frame (step S37 in FIG. 24A).

When the reply frame is not received (No branch of step S37 in FIG. 24A), for example, the start node 1A waits without doing anything.

On the other hand, when determining that the reply command is set in the received multi-frame (Yes branch of step S37 in FIG. 24A), the node 1A determines whether or not the node 1A is the start node (step S38 in FIG. 24A).

Here, since the node 1A is the start node (Yes branch of step S38 in FIG. 24A), on the basis of the C-Plane path information which is set in the received multi-frame and has already been used in other node on the end node side, the node 1A generates (selects) the C-Plane path information different from the above C-Plane path information (step S42 in FIG. 24A).

As a result, the start node 1A obtains the path management data of all the nodes (step S43 in FIG. 24A).

Next, the start node 1A determines whether or not the completion notices are received from the relay nodes 1B to 1F and the end node 1H (step S44 in FIG. 24B).

When the completion notices are not received (No branch of step S44 in FIG. 24B), the start node 1A, further, determines whether or not a predetermined time has passed (step S48 in FIG. 24B).

Here, when the predetermined time has not yet passed (No branch of step S48 in FIG. 24B), the start node 1A waits for the completion notices from the nodes 1B to 1H. When the completion notices are received within the predetermined time (Yes branch of step S44 in FIG. 24B), the start node 1A determines whether or not the replacement processing to the C-Plane path information is completed in the start node 1A (step S45 in FIG. 24B).

When the replacement is not completed (No branch of step S45 in FIG. 24B), the start node 1A replaces the manually managed path information held by (stored in) the start node 1A with the C-Plane path information (step S47 in FIG. 24B).

On the other hand, when the replacement in the start node 1A is completed (Yes branch of step S45 in FIG. 24B), by using the C-Plane, the start node 1A transmits the completion notice indicating that the replacement is completed and the C-Plane path information of the start node 1A to the other nodes 1B to 1H (step S46 in FIG. 24B, refer to reference symbol A22 in FIG. 21A).

On the other hand, when the completion notices from the nodes 1B to 1H are not received within the predetermined time (Yes branch of step S48 in FIG. 24B), the start node 1A re-transmits the execution frame including the C-Plane path information for the other nodes 1B to 1H (step S49 in FIG. 24B).

Next, the relay nodes 1B to 1F and the end node 1H determine whether or not the completion notice indicating that the replacement to the C-Plane path information is completed is received from the start node 1A within a predetermined time.

When the completion notice from the start node 1A is received within the predetermined time, the relay nodes 1B to 1F and the end node 1H complete the replacement processing to the C-Plane path information (refer to reference symbols B23, D23, E23, F23 and H23 in FIGS. 21A to 21B).

On the other hand, when the completion notice is not received from the start node 1A within the predetermined time, the relay nodes 1B to 1F and the end node 1H re-replace the replaced C-Plane path information with the original manually managed path information.

As described above, in this embodiment, since each node recognizes the C-Plane path information which has already been used in other nodes, the nodes generates the C-Plane path information individually, and replaces the manually managed path information with the C-Plane path information.

In this way, in addition to obtaining the same advantages as those of the above described embodiment, it is possible to realize an efficient replacement processing of the path setting information and a simple communication control.

Third Embodiment

The configurations and processes of the above described nodes 1 may be sorted out as needed, or combined arbitrarily.

For example, although, in the above described embodiments, the node 1 includes all functions of the start node, the relay node and the end node, the node 1 may include at least minimum necessary configurations and functions of these nodes.

Although the above embodiments describe a case in which the path setting information is integrated into the C-Plane path information when the node 1 has the manually managed path information and the C-Plane path information, the types and number of the path setting information items are not limited to these, and may be changed arbitrarily.

As described in embodiments, it is possible to efficiently replace communication-path-related setting information having different formats.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication apparatus operable to set a path based on path setting information used to set a communication path over a communication network formed by a plurality of the communication apparatuses, the communication apparatus comprising:
   a first storage medium operable to store first path setting information manually set by a network administrator and formatted with a first format;
   a second storage medium operable to store second path setting information formatted with a second format; and
   a controller configured to replace the first path setting information with the second path setting information,
   wherein the controller comprises:
      a receiving section operable to inquire the path setting information of an adjacent communication apparatus so as to receive the first path setting information;
      a generation section operable to generate the second path setting information including a parameter related to path setting and assigned by communication between communication apparatuses, the second path setting information being generated based on the first path setting information received at the receiving section; and
      a transmission section operable to transmit the second path setting information generated by the generation section to the adjacent communication apparatus,
   wherein the controller monitors whether a completion notice, indicating that second path setting information in the adjacent node has been replaced with the second path setting information transmitted by the transmission section, is received within a predetermined time,
   when the completion notice is not received from the adjacent apparatus within the predetermined time, the second path setting information generated by the generation section is transmitted by the transmission section to the adjacent apparatus again, and
   when the completion notice is received from the adjacent apparatus within the predetermined time, the controller replaces the first path setting information with the generated second path setting information and transmits a second completion notice to the adjacent node indicating that the replacement has been completed.

2. A communication apparatus operable to set a path based on path setting information used to set a communication path over a communication network formed by a plurality of the communication apparatuses, the communication apparatus comprising:
   a first storage medium operable to store first path setting information manually set by a network administrator and formatted with a first format;
   a second storage medium operable to store second path setting information formatted with a second format; and
   a controller configured to replace the first path setting information with the second path setting information,
   wherein the controller comprises:

a transmission section operable to transmit the first path setting information to a start node;

a receiving section operable to receive the second path setting information, the second path setting information being generated in the start node based on the first path setting information transmitted by the transmission section, the second path setting information including a parameter related to path setting and assigned by communication between communication apparatuses; and a control section operable to replace the first path setting information with the second path setting information received by the receiving section, wherein, when the replacement of the first path setting information with the second path setting information is completed, the controller transmits a completion notice to the start node, and wherein the controller monitors whether a second completion notice, indicating that a replacement has taken place in the start node, is received within a predetermined time and, when the second completion notice is not received within the predetermined time, the controller re-replaces the replaced second path setting information with the first path setting information.

3. A communication apparatus operable to set a path based on path setting information used to set a communication path over a communication network formed by a plurality of the communication apparatuses, the communication apparatus comprising:

a first storage medium operable to store first path setting information manually set by a network administrator and formatted with a first format;

a second storage medium operable to store second path setting information formatted with a second format; and a controller configured to replace the first path setting information with the second path setting information, wherein the controller comprises:

a control section operable to replace the first path setting information with the second path setting information including a parameter related to path setting and assigned by communication between communication apparatuses; and a transmission section operable to transmit the second path setting information to an adjacent communication apparatus on a start node side over the communication path, wherein, when the replacement of the first path setting information with the second path setting information is completed, the controller transmits a completion notice to the adjacent node, and wherein the controller monitors whether a second completion notice, indicating that a replacement has taken place in the adjacent node, is received within a predetermined time and, when the second completion notice is not received within the predetermined time, the controller re-replaces the replaced second path setting information with the first path setting information.

4. A path setting control method of a communication apparatus for setting a path based on path setting information used to set a communication path over a communication network formed by a plurality of the communication apparatuses, the path setting control method comprising:

storing second path setting information formatted with a second format in a second storage medium, the second path setting information being generated on a basis of first path setting information manually set by a network administrator and formatted with one of a first format included in other communication apparatuses and a first format transmitted from the other communication apparatuses; and converting control information of the communication apparatus in which the first path setting information is set, to the second path setting information formatted with the second format, wherein the converting comprises:

inquiring the first path setting information of an adjacent communication apparatus so as to receive the first path setting information;

generating the second path setting information including a parameter related to path setting and assigned by communication between communication apparatuses, the second path setting information being generated based on the first path setting information; and transmitting the second path setting information generated to the adjacent communication apparatus;

monitoring whether a completion notice, indicating that second path setting information in the adjacent node has been replaced with the transmitted second path setting information, is received within a predetermined time;

when the completion notice is not received from the adjacent apparatus within the predetermined time, transmitting the generated second path setting information to the adjacent apparatus again; and when the completion notice is received from the adjacent apparatus within the predetermined time, replacing the first path setting information with the generated second path setting information and transmitting a second completion notice to the adjacent node indicating that the replacement has been completed.

5. A path setting control method of a communication apparatus for setting a path based on path setting information used to set a communication path over a communication network formed by a plurality of the communication apparatuses, the path setting control method comprising:

storing second path setting information formatted with a second format in a second storage medium, the second path setting information being generated on a basis of first path setting information manually set by a network administrator and formatted with one of a first format included in other communication apparatuses and a first format transmitted from the other communication apparatuses;

replacing the first path setting information with the second path setting information;

wherein the converting comprises:

replacing the first path setting information with the second path setting information including a parameter related to path setting and assigned by communication between communication apparatuses; and transmitting the second path setting information to an adjacent communication apparatus on a start node side over the communication path;

when the replacement of the first path setting information with the second path setting information is completed, transmitting a completion notice to the adjacent node, and monitoring whether a second completion notice, indicating that a replacement has taken place in the adjacent node, is received within a predetermined time and, when the second completion notice is not received within the predetermined time, re-replacing the replaced second path setting information with the first path setting information.

6. A path setting control method for setting a path based on path setting information used to set a communication path over a communication network formed by a plurality of communication apparatuses, the path setting control method comprising:

transmitting a collection frame for inquiring first path setting information manually set by a network administrator and formatted with a first format of other communication apparatuses, by the communication apparatus as a start node of the communication path;

transmitting a reply frame in which the first path setting information is set, by the communication apparatus as an end node of the communication path receiving the collection frame;

generating the second path setting information including a parameter related to path setting and assigned by communication between communication apparatuses, based on the first path setting information received, by the communication apparatus as the start node;

transmitting an execution frame in which the generated second path setting information is set, to the other communication apparatuses, by the communication apparatus as the start node; and converting the control information of the communication apparatuses in which the first path setting information is set, to the second path setting information set in the transmitted execution frame, by the communication apparatuses on the communication path receiving the execution frame, wherein the other communication apparatuses transmits first report information indicating that converting is completed, to the communication apparatus as the start node, the communication apparatus as the start node re-transmits the execution frame when the communication apparatus does not receive the first report information within a predetermined time, the communication apparatus as the start node converts control information of the communication apparatus in which the first path setting information is set, to the second path setting information generated when the communication apparatus as the start node receives the first report information within the predetermined time;

the communication apparatus as the start node transmits second report information indicating that converting is completed in the communication apparatus as the start node, to the other communication apparatuses, and the other communication apparatuses restores the converted second path setting information to the first path setting information when the other communication apparatuses do not receive the second report information within a predetermined time.

* * * * *

UNITED STATES PATENT AND TRADEMARK OFFICE
CERTIFICATE OF CORRECTION

PATENT NO.           : 8,681,785 B2
APPLICATION NO.      : 12/579767
DATED                : March 25, 2014
INVENTOR(S)          : Shirai et al.

It is certified that error appears in the above-identified patent and that said Letters Patent is hereby corrected as shown below:

In the Claims

Column 28, Lines 2-3, In Claim 4, after "apparatuses;" delete "and".

Signed and Sealed this
Twenty-fourth Day of June, 2014

Michelle K. Lee
*Deputy Director of the United States Patent and Trademark Office*